United States Patent [19]
Cohen

[11] Patent Number: 5,453,946
[45] Date of Patent: Sep. 26, 1995

[54] DCT PERIPHERAL FOR A DIGITAL SIGNAL PROCESSOR

[75] Inventor: Paul E. Cohen, San Jose, Calif.

[73] Assignee: NEC Electronics, Inc., Mountain View, Calif.

[21] Appl. No.: 258,804

[22] Filed: Jun. 10, 1994

[51] Int. Cl.$^6$ ..................................................... G06F 7/38
[52] U.S. Cl. ............................................................. 364/725
[58] Field of Search ................................... 364/725, 726, 364/736, 754; 382/56

[56] References Cited

U.S. PATENT DOCUMENTS

| | | | |
|---|---|---|---|
| 4,958,312 | 9/1990 | Ang et al. | 364/736 |
| 4,999,799 | 3/1991 | Tufts | 364/726 |
| 5,202,847 | 4/1993 | Bolton et al. | 364/725 |

OTHER PUBLICATIONS

Paul M. Embree et al, "C Language Algorithms for Digital Signal Processing", Chapter 7, pp. 356–367, undated.
Jae S. Lim, "Two–Dimensional Signal and Image Processing", Chapter 3, pp. 148–162, 1990.
IEEE Micro Chips, Systems, Software, and Applications, "Guest Editors' Introduction Processing Hardware for Real–Time Video Coding", Oct., 1992, pp. 9–12.
IEEE Micro Chips, Systems, Software, and Applications, "Architecture and Implementation of ICs for a DSC–HDTV Video Decoder System", Oct., 1992, pp. 22–27.
IEEE Micro Chips, Systems, Software, and Applications, "A 160–Mpixel/s IDCT Processor for HDTV", Oct., 1992, pp. 28–32.

*Primary Examiner*—Tan V. Mai
*Attorney, Agent, or Firm*—Skjerven, Morrill, MacPherson, Franklin & Friel; Stephen A. Terrile

[57] ABSTRACT

A discrete cosine transform engine is disclosed. The engine receives an input matrix of data and provides a transformed matrix of data, the input matrix and the output matrix each having a plurality of row locations and a plurality of column locations. The engine includes a plurality of input accumulators and a plurality of output accumulators. The plurality of input accumulators accumulate data from the input matrix of data in parallel to provide a plurality of transform coefficient outputs. A digital signal processor receives the plurality of transform coefficients, multiplies the transform coefficients by a plurality of transform constants and provides a plurality of transform products. Each output accumulator receives the transform products and accumulates the products to provide the transformed matrix of data.

22 Claims, 10 Drawing Sheets

|   | $c_0=1$ | $r_4=1/2$ | $c_4$ | $c_1$ $c_3$ $c_5$ $c_7$ | $c_2$ $c_6$ | $r1$ $r3$ $r5$ $r7$ | $r2$ $r6$ |
|---|---|---|---|---|---|---|---|
| 1 | $\sigma_0$ | $\sigma_{61}$ | $\sigma_{14}$ | $\sigma_4$ | $\sigma_{13}$ | $\sigma_{49}$ | $\sigma_{57}$ |
| 2 | $\sigma_1$ | $\sigma_{62}$ | $\sigma_{22}$ | $\sigma_5$ | $\sigma_{15}$ | $\sigma_{50}$ | $\sigma_{58}$ |
| 3 | $\sigma_2$ |  | $\sigma_{30}$ | $\sigma_6$ | $\sigma_{21}$ | $\sigma_{51}$ | $\sigma_{59}$ |
| 4 | $\sigma_3$ |  | $\sigma_{38}$ | $\sigma_7$ | $\sigma_{23}$ | $\sigma_{52}$ | $\sigma_{60}$ |
| 5 | $\sigma_{24}$ |  | $\sigma_{43}$ | $\sigma_8$ | $\sigma_{29}$ | $\sigma_{53}$ |  |
| 6 | $\sigma_{36}$ |  | $\sigma_{48}$ | $\sigma_9$ | $\sigma_{31}$ | $\sigma_{54}$ |  |
| 7 | $\sigma_{42}$ |  |  | $\sigma_{10}$ | $\sigma_{37}$ | $\sigma_{55}$ |  |
| 8 | $\sigma_{63}$ |  |  | $\sigma_{11}$ | $\sigma_{40}$ | $\sigma_{56}$ |  |
| 9 |  |  |  | $\sigma_{12}$ | $\sigma_{44}$ |  |  |
| 10 |  |  |  | $\sigma_{16}$ | $\sigma_{45}$ |  |  |
| 11 |  |  |  | $\sigma_{17}$ | $\sigma_{46}$ |  |  |
| 12 |  |  |  | $\sigma_{18}$ | $\sigma_{47}$ |  |  |
| 13 |  |  |  | $\sigma_{19}$ |  |  |  |
| 14 |  |  |  | $\sigma_{20}$ |  |  |  |
| 15 |  |  |  | $\sigma_{25}$ |  |  |  |
| 16 |  |  |  | $\sigma_{26}$ |  |  |  |
| 17 |  |  |  | $\sigma_{27}$ |  |  |  |
| 18 |  |  |  | $\sigma_{28}$ |  |  |  |
| 19 |  |  |  | $\sigma_{32}$ |  |  |  |
| 20 |  |  |  | $\sigma_{33}$ |  |  |  |
| 21 |  |  |  | $\sigma_{34}$ |  |  |  |
| 22 |  |  |  | $\sigma_{35}$ |  |  |  |
| 23 |  |  |  | $\sigma_{39}$ |  |  |  |
| 24 |  |  |  | $\sigma_{41}$ |  |  |  |

FIG. 4

| | X Data | | Y Data |
|---|---|---|---|
| fdct_x: | $\sigma_{13}$ | fdct_y: | $c_6=0.392683$ |
| +1 | $c_2=0.92388$ | | $r_6=0.270598$ |
| +2 | $r_2=0.653282$ | | $Ol_{13}^2$ |
| +3 | $\sigma_{15}$ | | $Ol_{13}^6$ |
| +4 | $\sigma_{21}$ | | $Ol_{15}^2$ |
| +5 | $\sigma_{23}$ | | $Ol_{15}^6$ |
| +6 | $\sigma_{29}$ | | $Ol_{21}^2$ |
| +7 | $\sigma_{31}$ | | $Ol_{21}^6$ |
| +8 | $\sigma_{37}$ | | $Ol_{23}^2$ |
| +9 | $\sigma_{40}$ | | $Ol_{23}^6$ |
| +10 | $\sigma_{44}$ | | $Ol_{29}^2$ |
| +11 | $\sigma_{45}$ | | $Ol_{29}^6$ |
| +12 | $\sigma_{46}$ | | $Ol_{31}^2$ |
| +13 | $\sigma_{47}$ | | $Ol_{31}^6$ |
| +14 | $\sigma_{57}$ | | $Ol_{37}^2$ |
| +15 | $c_7=0.195090$ | | $Ol_{37}^6$ |
| +17 | $\sigma_{59}$ | | $Ol_{40}^2$ |
| +18 | $Rl_{57}^2$ | | $Ol_{40}^6$ |
| +19 | $Rl_{57}^6$ | | $Ol_{44}^2$ |
| +20 | $Rl_{59}^2$ | | $Ol_{44}^6$ |
| +21 | $Rl_{59}^6$ | | $Ol_{45}^2$ |
| +22 | $Rl_{60}^2$ | | $Ol_{45}^6$ |
| +23 | $Rl_{60}^6$ | | $Ol_{46}^2$ |
| +24 | $Ol_4^1$ | | $Ol_{46}^6$ |
| +25 | $Ol_4^3$ | | $Ol_{47}^2$ |
| +26 | $Ol_4^5$ | | $Ol_{47}^6$ |
| +27 | $Ol_4^7$ | | $\sigma_{58}$ |
| +28 | $Ol_5^1$ | | $c_5=0.55557$ |
| +29 | $Ol_5^3$ | | $c_1=0.980785$ |
| +30 | $Ol_5^5$ | | $c_3=0.83147$ |
| +31 | $Ol_5^7$ | | $\sigma_{60}$ |
| +32 | $Ol_6^1$ | | $c_4=0.707107$ |
| +33 | $Ol_6^3$ | | $\sigma_4$ |
| +34 | $Ol_6^5$ | | $\sigma_5$ |
| +35 | $Ol_6^7$ | | $\sigma_6$ |
| +37 | $Ol_7^1$ | | $\sigma_7$ |
| +38 | $Ol_7^3$ | | $\sigma_8$ |
| +39 | $Ol_7^5$ | | $\sigma_9$ |
| +40 | $Ol_7^7$ | | $\sigma_{10}$ |
| +41 | $Ol_8^1$ | | $\sigma_{11}$ |
| +42 | $Ol_8^3$ | | $\sigma_{12}$ |
| +43 | $Ol_8^5$ | | $\sigma_{16}$ |
| +44 | $Ol_8^7$ | | $\sigma_{17}$ |
| +45 | $Ol_9^1$ | | $\sigma_{18}$ |

| | X Data | | Y Data |
|---|---|---|---|
| +46 | $Ol_9^3$ | | $\sigma_{19}$ |
| +47 | $Ol_9^5$ | | $\sigma_{20}$ |
| +48 | $Ol_9^7$ | | $\sigma_{25}$ |
| +49 | $Ol_{10}^1$ | | $\sigma_{26}$ |
| +50 | $Ol_{10}^3$ | | $\sigma_{27}$ |
| +51 | $Ol_{10}^5$ | | $\sigma_{28}$ |
| +52 | $Ol_{10}^7$ | | $\sigma_{32}$ |
| +53 | $Ol_{11}^1$ | | $\sigma_{33}$ |
| +54 | $Ol_{11}^3$ | | $\sigma_{34}$ |
| +55 | $Ol_{11}^5$ | | $\sigma_{35}$ |
| +56 | $Ol_{11}^7$ | | $\sigma_{39}$ |
| +57 | $Ol_{12}^1$ | | $\sigma_{41}$ |
| +58 | $Ol_{12}^3$ | | $\sigma_{14}$ |
| +59 | $Ol_{12}^5$ | | $\sigma_{22}$ |
| +60 | $Ol_{12}^7$ | | $\sigma_{30}$ |
| +61 | $Ol_{16}^1$ | | $\sigma_{38}$ |
| +62 | $Ol_{16}^3$ | | $\sigma_{43}$ |
| +63 | $Ol_{16}^5$ | | $\sigma_{48}$ |
| +64 | $Ol_{16}^7$ | | $\sigma_{49}$ |
| +65 | $Ol_{17}^1$ | | $r_3=0.587938$ |
| +66 | $Ol_{17}^3$ | | $r_7=0.137949$ |
| +67 | $Ol_{17}^5$ | | $Ol_{49}^1$ |
| +68 | $Ol_{17}^7$ | | $Ol_{49}^3$ |
| +69 | $Ol_{18}^1$ | | $Ol_{49}^5$ |
| +70 | $Ol_{18}^3$ | | $Ol_{49}^7$ |
| +71 | $Ol_{18}^5$ | | $Ol_{50}^1$ |
| +72 | $Ol_{18}^7$ | | $Ol_{50}^3$ |
| +73 | $Ol_{19}^1$ | | $Ol_{50}^5$ |
| +74 | $Ol_{19}^3$ | | $Ol_{50}^7$ |
| +75 | $Ol_{19}^5$ | | $Ol_{51}^1$ |
| +76 | $Ol_{19}^7$ | | $Ol_{51}^3$ |
| +77 | $Ol_{20}^1$ | | $Ol_{51}^5$ |
| +78 | $Ol_{20}^3$ | | $Ol_{51}^7$ |
| +79 | $Ol_{20}^5$ | | $Ol_{52}^1$ |
| +70 | $Ol_{20}^7$ | | $Ol_{52}^3$ |
| +71 | $Ol_{25}^1$ | | $Ol_{52}^5$ |
| +72 | $Ol_{25}^3$ | | $Ol_{52}^7$ |
| +73 | $Ol_{25}^5$ | | $Ol_{53}^1$ |
| +74 | $Ol_{25}^7$ | | $Ol_{53}^3$ |
| +75 | $Ol_{26}^1$ | | $Ol_{53}^5$ |
| +76 | $Ol_{26}^3$ | | $Ol_{53}^7$ |
| +77 | $Ol_{26}^5$ | | $Ol_{54}^1$ |
| +78 | $Ol_{26}^7$ | | $Ol_{54}^3$ |
| +79 | $Ol_{27}^1$ | | $Ol_{54}^5$ |
| +80 | $Ol_{27}^3$ | | $Ol_{54}^7$ |
| +81 | $Ol_{27}^5$ | | $Ol_{55}^1$ |

FIG. 5A

| X Data | | Y Data | | X Data | |
|---|---|---|---|---|---|
| +82 | $Ol_{27}^7$ | | $Ol_{55}^3$ | +113 | $Ol_{30}^4$ |
| +83 | $Ol_{28}^1$ | | $Ol_{55}^5$ | +114 | $Ol_{38}^4$ |
| +84 | $Ol_{28}^3$ | | $Ol_{55}^7$ | +115 | $Ol_{43}^4$ |
| +85 | $Ol_{28}^5$ | | $Ol_{56}^1$ | +117 | $Ol_{48}^4$ |
| +86 | $Ol_{28}^7$ | | $Ol_{56}^3$ | +118 | $r_1=0.69352$ |
| +87 | $Ol_{32}^1$ | | $Ol_{56}^5$ | +119 | $r_5=0.392847$ |
| +88 | $Ol_{32}^3$ | | $Ol_{56}^7$ | +120 | $\sigma_0$ |
| +89 | $Ol_{32}^5$ | | $Ol_{61}^4$ | +121 | $Ol_0^0$ |
| +90 | $Ol_{32}^7$ | | $Ol_{62}^4$ | +122 | $\sigma_{50}$ |
| +91 | $Ol_{33}^1$ | | | +123 | $\sigma_1$ |
| +92 | $Ol_{33}^3$ | | | +124 | $Ol_1^0$ |
| +93 | $Ol_{33}^5$ | | | +125 | $\sigma_{51}$ |
| +94 | $Ol_{33}^7$ | | | +126 | $\sigma_2$ |
| +95 | $Ol_{34}^1$ | | | +127 | $Ol_2^0$ |
| +96 | $Ol_{34}^3$ | | | +128 | $\sigma_{52}$ |
| +97 | $Ol_{34}^5$ | | | +129 | $\sigma_3$ |
| +98 | $Ol_{34}^7$ | | | +130 | $Ol_3^0$ |
| +99 | $Ol_{35}^1$ | | | +131 | $\sigma_{53}$ |
| +100 | $Ol_{35}^3$ | | | +132 | $\sigma_{24}$ |
| +101 | $Ol_{35}^5$ | | | +133 | $Ol_{24}^0$ |
| +102 | $Ol_{35}^7$ | | | +134 | $\sigma_{54}$ |
| +103 | $Ol_{39}^1$ | | | +135 | $\sigma_{36}$ |
| +104 | $Ol_{39}^3$ | | | +137 | $Ol_{36}^0$ |
| +105 | $Ol_{39}^5$ | | | +138 | $\sigma_{55}$ |
| +106 | $Ol_{39}^7$ | | | +139 | $\sigma_{42}$ |
| +107 | $Ol_{41}^1$ | | | +140 | $Ol_{42}^0$ |
| +108 | $Ol_{41}^3$ | | | +141 | $\sigma_{56}$ |
| +109 | $Ol_{41}^5$ | | | +142 | $\sigma_{63}$ |
| +110 | $Ol_{41}^7$ | | | +143 | $Ol_{63}^0$ |
| +111 | $Ol_{14}^4$ | | | +144 | $\sigma_{61}$ |
| +112 | $Ol_{22}^4$ | | | +145 | $\sigma_{62}$ |

FIG. 5B

| | $c_1$ | | | |
|---|---|---|---|---|
| | $c_3$ | | | |
| | $c_5$ | $c_2$ | | |
| | $c_7$ | $c_6$ | $c_0=1$ | $c_4$ |
| 0 | $\tau_8$ | $\tau_{10}$ | $\tau_0$ | $\tau_{12}$ |
| 1 | $\tau_9$ | $\tau_{14}$ | $\tau_1$ | $\tau_{20}$ |
| 2 | $\tau_{11}$ | $\tau_{18}$ | $\tau_2$ | $\tau_{28}$ |
| 3 | $\tau_{13}$ | $\tau_{22}$ | $\tau_3$ | $\tau_{36}$ |
| 4 | $\tau_{15}$ | $\tau_{24}$ | $\tau_4$ | $\tau_{40}$ |
| 5 | $\tau_{16}$ | $\tau_{26}$ | $\tau_5$ | $\tau_{44}$ |
| 6 | $\tau_{17}$ | $\tau_{30}$ | $\tau_6$ | $\tau_{52}$ |
| 7 | $\tau_{19}$ | $\tau_{34}$ | $\tau_7$ | $\tau_{60}$ |
| 8 | $\tau_{21}$ | $\tau_{38}$ | | |
| 9 | $\tau_{23}$ | $\tau_{42}$ | | |
| 10 | $\tau_{25}$ | $\tau_{46}$ | | |
| 11 | $\tau_{27}$ | $\tau_{50}$ | | |
| 12 | $\tau_{29}$ | $\tau_{54}$ | | |
| 13 | $\tau_{31}$ | $\tau_{56}$ | | |
| 14 | $\tau_{32}$ | $\tau_{58}$ | | |
| 15 | $\tau_{33}$ | $\tau_{61}$ | | |
| 16 | $\tau_{35}$ | | | |
| 17 | $\tau_{37}$ | | | |
| 18 | $\tau_{39}$ | | | |
| 19 | $\tau_{41}$ | | | |
| 20 | $\tau_{43}$ | | | |
| 21 | $\tau_{45}$ | | | |
| 22 | $\tau_{47}$ | | | |
| 23 | $\tau_{48}$ | | | |
| 24 | $\tau_{49}$ | | | |
| 25 | $\tau_{51}$ | | | |
| 26 | $\tau_{53}$ | | | |
| 27 | $\tau_{55}$ | | | |
| 28 | $\tau_{57}$ | | | |
| 29 | $\tau_{59}$ | | | |
| 30 | $\tau_{62}$ | | | |
| 31 | $\tau_{63}$ | | | |

| | YData | | YData |
|---|---|---|---|
| +80 | $Ol_{31}^1$ | +116 | $Ol_{47}^1$ |
| +81 | $Ol_{31}^3$ | +117 | $Ol_{47}^3$ |
| +82 | $Ol_{31}^5$ | +118 | $Ol_{47}^5$ |
| +83 | $Ol_{31}^7$ | +119 | $Ol_{47}^7$ |
| +84 | $Ol_{32}^1$ | +120 | $Ol_{49}^1$ |
| +85 | $Ol_{32}^3$ | +121 | $Ol_{49}^3$ |
| +86 | $Ol_{32}^5$ | +122 | $Ol_{49}^5$ |
| +87 | $Ol_{32}^7$ | +123 | $Ol_{49}^7$ |
| +88 | $Ol_{33}^1$ | +124 | $Ol_{51}^1$ |
| +89 | $Ol_{33}^3$ | +125 | $Ol_{51}^3$ |
| +90 | $Ol_{33}^5$ | +126 | $Ol_{51}^5$ |
| +91 | $Ol_{33}^7$ | +127 | $Ol_{51}^7$ |
| +92 | $Ol_{35}^1$ | +128 | $Ol_{53}^1$ |
| +93 | $Ol_{35}^3$ | +129 | $Ol_{53}^3$ |
| +94 | $Ol_{35}^5$ | +130 | $Ol_{53}^5$ |
| +95 | $Ol_{35}^7$ | +131 | $Ol_{53}^7$ |
| +96 | $Ol_{37}^1$ | +132 | $Ol_{55}^1$ |
| +97 | $Ol_{37}^3$ | +133 | $Ol_{55}^3$ |
| +98 | $Ol_{37}^5$ | +134 | $Ol_{55}^5$ |
| +99 | $Ol_{37}^7$ | +135 | $Ol_{55}^7$ |
| +100 | $Ol_{39}^1$ | +137 | $Ol_{57}^1$ |
| +101 | $Ol_{39}^3$ | +138 | $Ol_{57}^3$ |
| +102 | $Ol_{39}^5$ | +139 | $Ol_{57}^5$ |
| +103 | $Ol_{39}^7$ | +140 | $Ol_{57}^7$ |
| +104 | $Ol_{41}^1$ | +141 | $Ol_{59}^1$ |
| +105 | $Ol_{41}^3$ | +142 | $Ol_{59}^3$ |
| +106 | $Ol_{41}^5$ | +143 | $Ol_{59}^5$ |
| +107 | $Ol_{41}^7$ | +144 | $Ol_{59}^7$ |
| +108 | $Ol_{43}^1$ | +145 | $Ol_{62}^1$ |
| +109 | $Ol_{43}^3$ | +146 | $Ol_{62}^3$ |
| +110 | $Ol_{43}^5$ | +147 | $Ol_{62}^5$ |
| +111 | $Ol_{43}^7$ | +148 | $Ol_{62}^7$ |
| +112 | $Ol_{45}^1$ | +149 | $Ol_{63}^1$ |
| +113 | $Ol_{45}^3$ | +150 | $Ol_{63}^3$ |
| +114 | $Ol_{45}^5$ | +151 | $Ol_{63}^5$ |
| +115 | $Ol_{45}^7$ | +152 | $Ol_{63}^7$ |

FIG. 8B

DCT PERIPHERAL FOR A DIGITAL SIGNAL PROCESSOR

BACKGROUND OF THE INVENTION

The present invention relates to discrete cosine transforms, and more particularly, to an engine for performing discrete cosine transforms.

It is desirable to compress image signals which are used with computer systems as an image signal for a single uncompressed high resolution digitized color image can easily fill several megabytes of storage. Because images generally have low information content, very good compression rates are possible. This is especially true if, as is often the case with image signals which are used with televisions or computer systems, perfect reproduction is not required. When perfect reproduction is not required, the low frequency components of a frequency domain image signal are perceptually more important in reproducing the image than the high frequency components of the frequency domain image signal. Thus, compression schemes that are applied to the frequency domain version of an image signal do not waste unnecessary bits in accurately representing the high frequency portions of the image signal.

Accordingly, it is desirable to transform an image signal from the spacial domain to the frequency domain prior to compressing the image signal. One type of transform that is desirable when transforming image signals is the discrete cosine transform (DCT). Examples of compression schemes which use a DCT include a Joint Photographics Experts Group standard (JPEG), a Moving Pictures Expert Group standard (MPEG), and a Consulting Committee for International Telegraphy and Telephony standard (CCITTH.261). A DCT is similar to a Fourier transform; an 8×8 DCT can be computed as a 16×16 Fourier transform. A DCT includes a pair of transforms, a forward DCT (FDCT), which maps a digitized signal to a frequency domain signal, and an inverse DCT (IDCT), which maps a frequency domain signal to a digitized signal.

It is known to perform DCT's in software on a personal computer to compress and decompress an image signal. When transforming a color image signal compared to a monochrome image signal, the amount of computation required increases by a factor of three. Additionally, the amount of computation required to transform an image increases as the square of the size of the screen of the computer.

When compressing an image signal, it is desirable to perform the DCTs quickly as compressing an image signal requires many DCTs to be performed. For example, to perform a JPEG compression of a 1024 by 1024 pixel color image requires 49,152 8×8 DCT's. If 30 images are compressed or decompressed every second, as is suggested to provide full motion video, then a DCT must be performed every 678 nsec. The calculation of a single 8×8 DCT (using the standard definition of a DCT transform) requires more that 9200 multiplications and more than 4000 additions.

It is known to perform DCTs on a matrix of data by first transforming the rows of data and then transforming the transformed columns to provide a transformed matrix of data. Such a system is relatively slow as the system includes the extra step of transforming the transformed rows of data.

It is desirable to perform DCTs using a digital signal processor (DSP) system as such a system efficiently performs many of the mathematical operations necessary to performing a DCT. However, DSP systems generally have more limited memory accessing capabilities than more general purpose computer systems.

SUMMARY OF THE INVENTION

It has been discovered that by dividing a DCT into a plurality of functions which may be performed in parallel, performing the functions in parallel, and distributing the results of the functions in memory, a DCT engine may be provided which efficiently functions in a DSP system implementation.

In one embodiment, the invention relates to providing a plurality of input accumulator circuits which, based upon subsets of input data, provide transform coefficients, a digital signal processor which calculates a set of product values based upon the transform coefficients, a set of output accumulator circuits which accumulate subsets of the transform products to provide a matrix of transformed data, and a circuit for distributing the transform coefficients and the transform products in memory to allow the digital signal processor to efficiently access the transform coefficients and provide the product values.

BRIEF DESCRIPTION OF THE DRAWINGS

FIG. 4 shows an example of a distribution of constants and transform coefficients for a forward DCT.

FIGS. 5A and 5B show an example of a memory distribution for using a DCT engine with a DSP system to perform a forward DCT in accordance with the present invention.

FIG. 7 shows an example of a distribution of constants and transform coefficients for an inverse DCT.

FIGS. 8A and 8B show an example of a memory distribution for using a DCT engine with a DSP system to perform an inverse DCT in accordance with the present invention.

DETAILED DESCRIPTION OF THE DRAWINGS

The following sets forth a detailed description of the best contemplated mode for carrying out the invention. The description is intended to be illustrative of the invention and should not be taken to be limiting.

Figure 1:
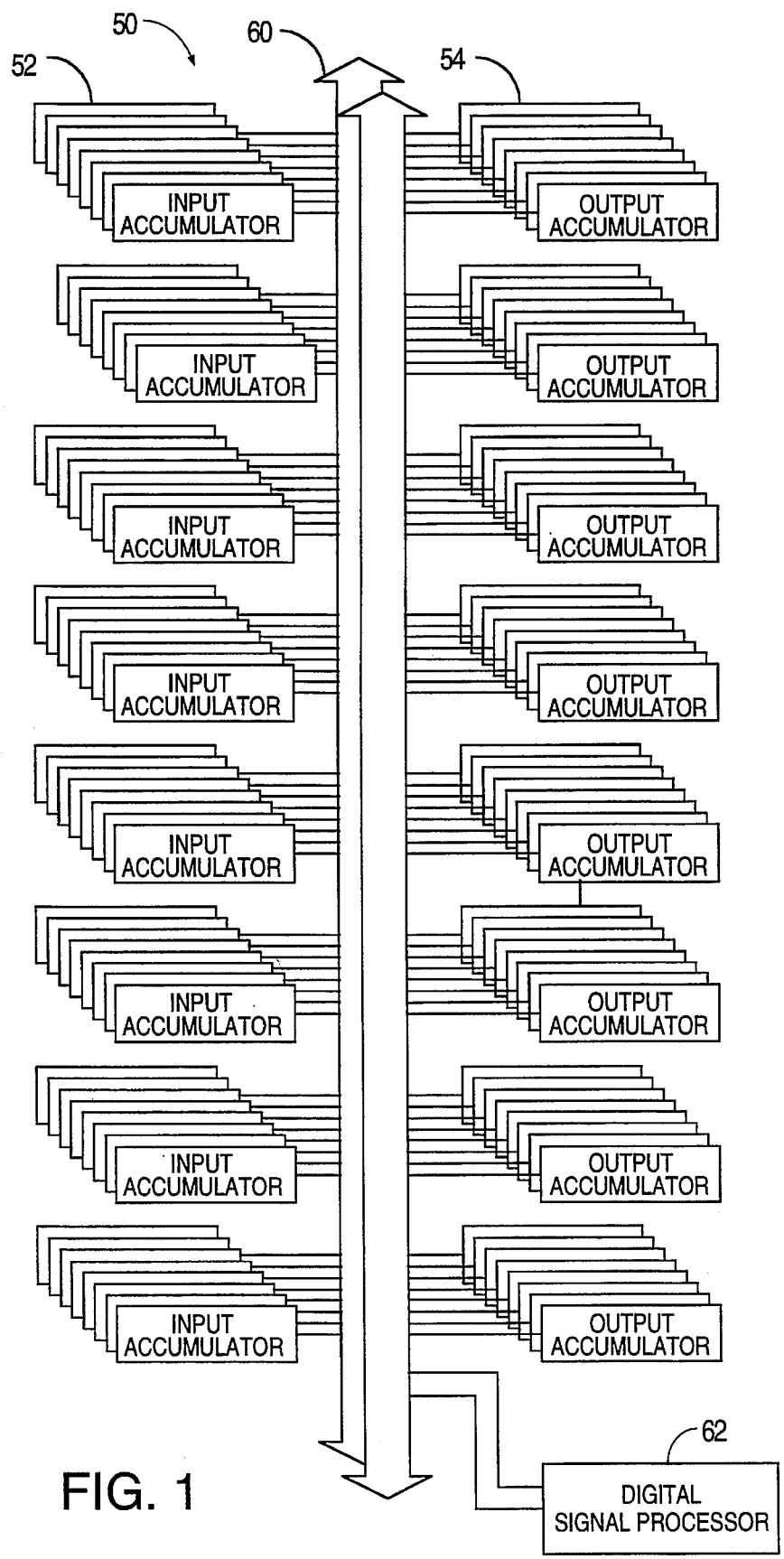
FIG. 1 shows a block diagram of a DCT engine in accordance with the present invention.

Referring to FIG. 1, a DCT engine, which functions as a peripheral device for a digital signal processor (DSP), is shown. DCT engine 50 includes a plurality of input accumulator circuits 52 and a plurality of output accumulator circuits 54. Input accumulator circuits 52 and output accumulator circuits 54 receive input data from and provide sum data to Input/Output (I/O) bus 60. I/O bus 60 is also coupled with digital signal processor (DSP) 62. In the preferred embodiment, DSP 62 is integrated on the same silicon as DCT engine 50 and I/O bus 60. DSP 61 is available from NEC under the trade designation μ PD7701X.

Input accumulator circuits 52 are arranged in an 8×8 matrix. I.e., there are eight sets of accumulator circuits connected eight in parallel coupled to I/O bus 60. For notation purposes, these accumulator circuits are referred to as IAdd(L), where L indicates the location of the adder circuit in the matrix which is indexed to correspond to a singly indexed vector. For example, IAdd(0) indicates the input accumulator circuit which is located at row 0, column 0 of the matrix and IAdd(63) indicates the input accumulator circuit which is located at row 7, column 7 of the matrix. Each input accumulation circuit 52 provides a corresponding transform coefficient to I/O bus 60.

Output accumulator circuits 54 are arranged as an 8×8 matrix. I.e., there are eight sets of output accumulator circuits that are connected eight in parallel to I/O bus 60. For notation purposes, these accumulator circuits are referred to as OAdd(L), where L indicates the location of the accumulator circuit in the matrix which is indexed to correspond to a singly indexed vector. For example, OAdd(0) indicates the accumulator circuit which is located at row 0, column 0 of the matrix and OAdd(63) indicates the accumulator circuit which is located at location row 7, column 7 of the matrix. Each output accumulator circuit provides a corresponding location of the output data to I/O bus 60.

I/O bus 60 includes two separate data buses which are coupled to respective address buses. These data and address buses are also directly coupled to DSP 62, which includes two data bus connections and two address bus connections.

DSP 62 includes first and second internal buses which are coupled to respective address and data buses of I/O bus 60 and which access respective memories within DSP 62. DSP 62 also includes eight general purpose registers, R0–R7 and eight data pointers, DP0–DP7. Data pointers DP0–DP3 point to memory locations which are accessed via the first internal bus and data pointers DP4–DP7 point to memory locations which are accessed via the second internal bus.

When performing a FDCT and an IDCT, the accumulation times account for a substantial percentage of the time required in performing the DCTs. Accordingly, by providing the matrices of input and output accumulator circuits, DCT engine 50 significantly increases the speed with which a DCT is performed. Additionally, by providing a digital signal processor which efficiently performs multiplications, the combination of DCT engine 50 and DSP 62 significantly increases the speed with which a DCT is performed when compared to performing the DCT using a DCT engine which is coupled to a general purpose computer which performs the multiplications of the DCT. However, when using a DSP to perform the multiplications, the addressing capabilities of the DSP must be addressed. More specifically, incremental addressing may be efficiently performed using a DSP while random addressing using a DSP is more difficult to perform.

Figure 2:
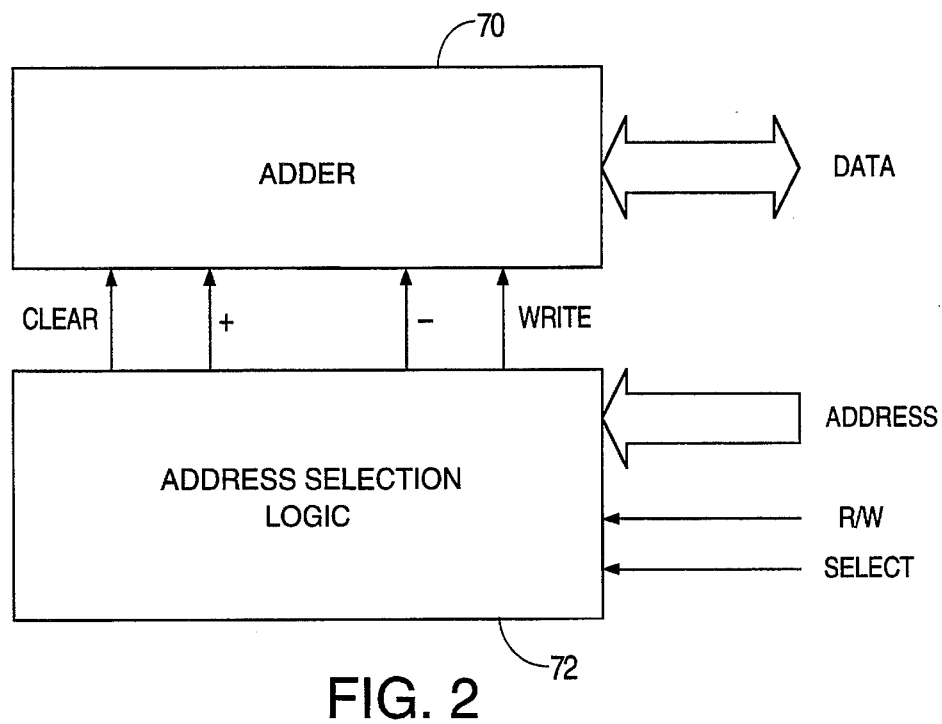
FIG. 2 shows an accumulator circuit of the FIG. 1 DCT engine.

Referring to FIG. 2, every input accumulator circuit 50 and every output accumulator circuit 52 includes arithmetic unit 70 and address selection unit 72. Arithmetic unit 70 is coupled with the data bus portion of I/O bus 60. Arithmetic unit 70 also receives a plurality of control signals from address selection unit 72; these control signals include an add signal (+), a subtract signal (−), a clear signal and a write signal. In addition to providing the control signals to arithmetic unit 70, address selection unit 72 is coupled to the address bus portion of I/O bus 60 and receives a plurality of control signals from the I/O bus; these control signals include a read/write (R/W) signal and a select signal. Address selection unit 72 monitors the address portion of I/O bus 60 for one of possibly many relevant addresses and generates either an add, subtract, clear or write strobe signal depending on which address and control signals appear on I/O bus 60.

DCT engine 50 performs a DCT on the 8×8 matrices F and f. In the 8×8 spacial matrix F, i and j represent the coordinates for the matrix locations within the spacial matrix and in the 8×8 frequency matrix f, u and v are coordinates for the matrix locations within the frequency matrix. The forward DCT of the spacial matrix is set forth by the following equation.

$$F_{uv} = \frac{1}{4} \cdot K_u K_v \cdot \Sigma_i \Sigma_j f_{ij} \cdot \cos\left[(2 \cdot i + 1) \cdot u \cdot \frac{\pi}{16}\right] \cdot \cos\left[(2 \cdot j + 1) \cdot v \cdot \frac{\pi}{16}\right]$$

The inverse DCT for the frequency matrix is set forth by the equation.

$$f_{ij} = \frac{1}{4} \cdot \Sigma_u \Sigma_v K_u \cdot K_v \cdot \cos\left[(2 \cdot i + 1) \cdot u \cdot \frac{\pi}{16}\right] \cdot \cos\left[(2 \cdot j + 1) \cdot v \cdot \frac{\pi}{16}\right]$$

By defining the cosine constant $c_i$ as $$\cos\left[\pi \cdot \frac{i}{16}\right]$$

the trigonometric identity $$2 \cdot c_i \cdot c_j = c_{i+j} + c_{i-j}$$

is provided. By substituting this identity into the formulas F and f, the following equations result.

$$F_{uv} = \frac{1}{8} \cdot K_u \cdot K_v \cdot \Sigma_i \Sigma_j f_{ij} \cdot [c_{(2+i+1) \cdot u + (2 \cdot j + 1) \cdot v} + c_{(2 \cdot i + 1) \cdot u - (2 \cdot j + 1) \cdot v}]$$

$$f_{ij} = \frac{1}{8} \cdot \Sigma_u \Sigma_v K_u \cdot K_v \cdot F_{uv} \cdot [c_{(2 \cdot i + 1) \cdot u + (2 \cdot j + 1) \cdot v} + c_{(2 \cdot i + 1) \cdot u - (2 \cdot j + 1) \cdot v}]$$

Note that $c_i$ takes on only sixteen different values, $c_0$ to $c_7$ and $-c_0$ to $-c_7$. Accordingly, the only products that must be formed use these constants as one of their terms. Also, $$c_0 = 1 \text{ and } c_4 = \frac{\sqrt{2}}{2}$$

By manipulating the DCT formulas so that the cosine constants are isolated, it is possible to use highly parallel accumulations when calculating the FDCT and the IDCT. Additionally, by grouping functions which use the same constant terms, it is possible to perform highly parallel multiplications using the constant terms. The forward and inverse DCTs are dealt with separately as set forth by the following equations, where $\sigma$ is the forward DCT coefficient vector and $\tau$ is the inverse DCT coefficient vector.

$$F_{uv} = \Sigma_k \sigma_k \cdot c_k$$

$$f_{ij} = \Sigma_k \Sigma_k \cdot c_k$$

The computation of the FDCT is set forth as follows. Notation for the matrix of transformed data is indexed as a singly indexed vector as represented by the subscripts of X in FIG. 3. The first step in the FDCT is calculating the forward transform coefficient vectors $\sigma_0$ to $\sigma_{63}$ as follows.

$\sigma_0 = f_0 - f_7 + f_9 - f_{14} + f_{18} - f_{21} + f_{27} - f_{28} - f_{35} + f_{36} - f_{42} + f_{45} - f_{49} + f_{54} - f_{56} + f_{63}$ $\sigma_1 = -f_2 + f_5 + f_8 - f_{15} - f_{19} + f_{20} - f_{25} + f_{30} + f_{33} - f_{38} + f_{43} - f_{44} - f_{48} + f_{55} + f_{58} - f_{61}$ $\sigma_2 = -f_1 + f_6 + f_{11} - f_{12} + f_{16} - f_{23} + f_{26} - f_{29} - f_{34} + f_{37} - f_{40} + f_{47} - f_{51} + f_{52} + f_{57} - f_{62}$ $\sigma_3 = -f_3 + f_4 + f_{10} - f_{13} - f_{17} + f_{22} + f_{24} - f_{31} - f_{32} + f_{39} + f_{41} - f_{46} - f_{50} + f_{53} + f_{59} - f_{60}$ $\sigma_4 = f_8 - f_9 - f_{10} + f_{11} + f_{12} - f_{13} - f_{14} + f_{15} + f_{16} - f_{17} - f_{18} + f_{19} + f_{20} - f_{21} - f_{22} + f_{23} - f_{40} + f_{41} + f_{42} - f_{43} - f_{44} + f_{45} + f_{46} - f_{47} - f_{48} + f_{49} + f_{50} - f_{51} - f_{52} + f_{53} + f_{54} - f_{55}$ $\sigma_5 = f_8 - f_9 - f_{10} + f_{11} + f_{12} - f_{13} - f_{14} + f_{15} - f_{16} + f_{17} + f_{18} - f_{19} - f_{20} + f_{21} + f_{22} - f_{23} + f_{40} - f_{41} - f_{42} + f_{43} + f_{44} - f_{45} - f_{46} + f_{47} + f_{48} + f_{49} + f_{50} - f_{51} - f_{52} + f_{53} + f_{54} - f_{55}$ $\sigma_6 = f_0 - f_1 - f_2 + f_3 + f_4 - f_5 - f_6 + f_7 - f_{24} + f_{25} + f_{26} - f_{27} - f_{28} + f_{29} + f_{30} - f_{31} - f_{32} + f_{33} - f_{34} + f_{35} + f_{36} - f_{37} - f_{38} + f_{39} - f_{56} + f_{57} + f_{58} - f_{59} - f_{60} + f_{61} + f_{62} - f_{63}$ $\sigma_7 = f_0 - f_1 - f_2 + f_3 + f_4 - f_5 - f_6 + f_7 + f_{24} - f_{25} - f_{26} + f_{27} + f_{28} - f_{29} - f_{30} + f_{31} - f_{32} + f_{33} + f_{34} - f_{35} - f_{36} + f_{37} + f_{38} - f_{39} - f_{56} + f_{57} + f_{58} - f_{59} - f_{60} + f_{61} + f_{62} - f_{63}$ $\sigma_8 = f_1 + f_2 - f_5 - f_6 - f_9 - f_{10} + f_{13} + f_{14} - f_{17} - f_{18} + f_{21} + f_{22} + f_{25} + f_{26} - f_{29} - f_{30} + f_{33} + f_{34} - f_{37} - f_{38} - f_{41} - f_{42} + f_{45} + f_{46} - f_{49} - f_{50} + f_{53} + f_{54} + f_{57} + f_{58} - f_{61} - f_{62}$ $\sigma_9 = f_1 - f_2 + f_5 - f_6 - f_9 + f_{10} - f_{13} + f_{14} - f_{17} + f_{18} - f_{21} + f_{22} + f_{25} - f_{26} + f_{29} - f_{30} + f_{33} - f_{34} + f_{37} - f_{38} - f_{41} + f_{42} - f_{45} + f_{46} - f_{49} + f_{50} - f_{53} + f_{54} + f_{57} - f_{58} + f_{61} - f_{62}$ $\sigma_{10} = f_0 + f_3 - f_4 - f_7 - f_8 - f_{11} + f_{12} + f_{15} - f_{16} - f_{19} + f_{20} + f_{23} + f_{24} + f_{27} - f_{28} - f_{31} + f_{32} + f_{35} - f_{36} - f_{39} - f_{40} - f_{43} + f_{44} + f_{47} - f_{48} - f_{51} + f_{52} + f_{55} + f_{56} + f_{59} - f_{60} - f_{63}$ $\sigma_{11} = f_0 - f_3 + f_4 - f_7 - f_8 + f_{11} - f_{12} + f_{15} - f_{16} + f_{19} + f_{20} + f_{23} - f_{24} - f_{27} - f_{28} - f_{31} + f_{32} - f_{35} + f_{36} - f_{39} - f_{40} + f_{43} - f_{44} + f_{47} - f_{48} + f_{51} - f_{52} + f_{55} + f_{56} - f_{59} - f_{60} - f_{63}$ $\sigma_{12} = f_0 + f_1 - f_6 - f_7 + f_{10} + f_{11} - f_{12} - f_{13} - f_{18} - f_{19} + f_{20} + f_{21} - f_{24} - f_{25} + f_{30} + f_{31} - f_{32} - f_{33} + f_{38} + f_{39} - f_{42} - f_{43} + f_{44} + f_{45} + f_{50} + f_{51} - f_{52} - f_{53} + f_{56} + f_{57} - f_{62} - f_{63}$ $\sigma_{13} = f_0 + f_1 - f_6 - f_7 + f_8 + f_{10} - f_{13} - f_{15} + f_{17} + f_{19} - f_{20} - f_{22} + f_{26} + f_{27} + f_{28} - f_{29} - f_{34} + f_{35} - f_{36} + f_{37} - f_{41} - f_{43} + f_{44} + f_{46} - f_{48} - f_{50} + f_{53} + f_{55} - f_{56} - f_{57} + f_{62} + f_{63}$ $\sigma_{14} = f_1 + f_2 - f_5 - f_6 + f_8 + f_{11} - f_{12} - f_{15} + f_{16} - f_{19} + f_{20} - f_{23} - f_{25} - f_{26} + f_{29} - f_{30} - f_{33} + f_{34} + f_{37} - f_{38} - f_{40} + f_{43} - f_{44} + f_{47} + f_{48} - f_{51} + f_{52} + f_{55} - f_{57} - f_{58} + f_{61} + f_{62}$ $\sigma_{15} = f_2 + f_3 - f_4 - f_5 + f_9 - f_{11} + f_{12} - f_{14} + f_{16} - f_{18} + f_{21} - f_{23} + f_{24} - f_{25} + f_{30} - f_{31} - f_{32} + f_{33} - f_{38} + f_{39} - f_{40} + f_{42} - f_{45} + f_{47} - f_{49} + f_{51} - f_{52} + f_{54} - f_{58} - f_{59} + f_{60} + f_{61}$ $\sigma_{16} = f_0 - f_3 - f_4 + f_7 + f_8 - f_{11} - f_{12} + f_{15} + f_{17} - f_{18} - f_{21} + f_{22} + f_{25} - f_{26} - f_{29} + f_{30} - f_{33} + f_{34} + f_{37} - f_{38} - f_{41} + f_{42} + f_{45} - f_{46} - f_{48} + f_{51} + f_{52} - f_{55} - f_{56} + f_{59} + f_{60} - f_{63}$ $\sigma_{17} = f_0 - f_3 - f_4 + f_7 + f_9 - f_{10} - f_{13} + f_{14} + f_{16} - f_{19} - f_{20} + f_{23} - f_{25} + f_{26} + f_{29} - f_{30} - f_{33} + f_{34} + f_{37} - f_{38} - f_{40} + f_{43} + f_{44} - f_{47} - f_{49} + f_{50} + f_{53} - f_{54} - f_{56} + f_{59} + f_{60} - f_{63}$ $\sigma_{18} = f_1 - f_2 - f_5 + f_6 + f_8 - f_{11} - f_{12} + f_{15} - f_{17} + f_{18} + f_{21} - f_{22} + f_{24} - f_{27} - f_{28} + f_{31} - f_{32} + f_{35} + f_{36} - f_{39} + f_{41} - f_{42} - f_{45} + f_{46} - f_{48} + f_{51} + f_{52} - f_{55} - f_{57} + f_{58} + f_{61} - f_{62}$ $\sigma_{19} = f_1 - f_2 - f_5 + f_6 - f_9 + f_{10} + f_{13} - f_{14} + f_{16} - f_{19} + f_{20} - f_{23} - f_{24} + f_{27} + f_{28} - f_{31} - f_{32} + f_{35} - f_{36} + f_{39} - f_{40} + f_{43} + f_{44} - f_{47} - f_{49} + f_{50} + f_{53} - f_{54} - f_{57} + f_{58} + f_{61} - f_{62}$ $\sigma_{20} = f_2 - f_3 + f_4 - f_5 + f_8 - f_9 + f_{14} - f_{15} - f_{16} + f_{17} - f_{22} + f_{23} - f_{26} + f_{27} - f_{28} + f_{29} - f_{34} + f_{35} - f_{36} + f_{37} - f_{40} + f_{41} - f_{46} + f_{47} + f_{48} - f_{49} + f_{54} - f_{55} + f_{58} - f_{59} + f_{60} - f_{61}$ $\sigma_{21} = f_0 - f_2 + f_5 - f_7 - f_{10} - f_{11} + f_{12} + f_{13} + f_{16} - f_{17} + f_{22} - f_{23} + f_{25} - f_{27} + f_{28} - f_{30} - f_{33} + f_{35} - f_{36} + f_{38} - f_{40} + f_{41} - f_{46} + f_{47} + f_{50} - f_{51} - f_{52} + f_{53} + f_{58} - f_{59} + f_{60} - f_{61}$ $\sigma_{22} = f_0 - f_3 + f_4 - f_7 - f_9 + f_{10} + f_{13} - f_{14} + f_{17} - f_{18} + f_{21} - f_{22} + f_{24} + f_{27} - f_{28} - f_{31} - f_{32} - f_{35} + f_{36} + f_{39} - f_{41} + f_{42} - f_{45} + f_{46} + f_{49} + f_{50} - f_{53} - f_{54} + f_{56} + f_{59} - f_{60} - f_{63}$ $\sigma_{23} = -f_1 - f_3 + f_4 + f_6 + f_8 + f_9 - f_{14} - f_{15} - f_{18} + f_{19} - f_{20} + f_{21} - f_{24} + f_{26} + f_{29} + f_{31} + f_{32} + f_{34} - f_{37} - f_{39} + f_{42} - f_{43} + f_{44} - f_{45} - f_{48} + f_{49} + f_{54} + f_{55} + f_{57} - f_{59} - f_{60} - f_{62}$ $\sigma_{24} = f_0 - f_3 - f_4 + f_7 + f_9 - f_{10} - f_{13} + f_{14} - f_{17} + f_{18} + f_{21} - f_{22} + f_{24} + f_{27} - f_{28} - f_{31} + f_{32} + f_{35} - f_{36} - f_{39} - f_{41} + f_{42} - f_{45} + f_{46} + f_{49} - f_{50} - f_{53} + f_{54} + f_{56} - f_{59} - f_{60} + f_{63}$ $\sigma_{25} = f_0 - f_2 + f_5 - f_7 - f_9 - f_{11} + f_{12} + f_{14} + f_{17} - f_{19} - f_{20} - f_{22} - f_{24} + f_{26} - f_{29} + f_{31} - f_{32} + f_{34} - f_{37} + f_{39} + f_{41} + f_{43} - f_{44} - f_{46} - f_{49} - f_{51} + f_{52} + f_{54} + f_{56} - f_{58} + f_{61} - f_{63}$ $\sigma_{26} = -f_2 - f_3 + f_4 + f_5 + f_8 + f_9 - f_{14} - f_{15} - f_{16} - f_{17} + f_{22} + f_{23} + f_{26} + f_{27} - f_{28} - f_{29} + f_{34} + f_{35} - f_{36} - f_{37} - f_{40} - f_{41} + f_{46} + f_{47} + f_{48} + f_{49} - f_{54} - f_{55} - f_{58} - f_{59} + f_{60} + f_{61}$ $\sigma_{27} = f_0 - f_1 + f_6 - f_7 - f_{10} + f_{11} - f_{12} + f_{13} + f_{18} - f_{19} + f_{20} - f_{21} - f_{24} + f_{24} + f_{25} - f_{30} + f_{31} - f_{32} + f_{33} - f_{38} + f_{39} + f_{42} - f_{43} + f_{44} - f_{45} - f_{50} + f_{51} - f_{52} + f_{53} + f_{56} - f_{57} + f_{62} - f_{63}$ $\sigma_{28} = f_1 - f_3 + f_4 - f_6 - f_8 - f_{10} + f_{13} + f_{15} + f_{16} + f_{18} - f_{21} - f_{23} - f_{25} + f_{27} - f_{28} - f_{30} - f_{33} + f_{35} - f_{36} + f_{38} + f_{40} - f_{42} - f_{45} - f_{47} - f_{48} - f_{50} + f_{53} + f_{55} + f_{57} - f_{59} + f_{60} - f_{62}$ $\sigma_{29} = -f_1 + f_3 - f_4 + f_6 + f_8 - f_9 + f_{14} - f_{15} + f_{18} + f_{19} - f_{20} - f_{21} + f_{24} - f_{26} + f_{29} - f_{31} - f_{32} + f_{34} - f_{37} + f_{39} - f_{42} - f_{43} + f_{44} + f_{45} - f_{48} + f_{49} - f_{54} + f_{55} + f_{57} - f_{59} + f_{60} - f_{62}$ $\sigma_{30} = f_0 + f_3 - f_4 - f_7 - f_9 + f_{10} - f_{13} + f_{14} - f_{17} - f_{18} + f_{21} + f_{22} - f_{24} + f_{27} + f_{31} - f_{32} - f_{35} + f_{36} - f_{39} + f_{41} + f_{42} - f_{45} - f_{46} + f_{49} - f_{50} + f_{53} - f_{54} - f_{56} - f_{59} + f_{60} + f_{63}$ $\sigma_{31} = f_0 + f_2 - f_5 - f_7 - f_{10} + f_{11} - f_{12} + f_{13} - f_{16} - f_{17} + f_{22} + f_{23} - f_{25} - f_{27} + f_{28} + f_{30} + f_{33} + f_{35} - f_{36} - f_{38} + f_{40} + f_{41} - f_{46} - f_{47} + f_{50} - f_{51} + f_{52} - f_{53} - f_{56} - f_{58} + f_{61} + f_{63}$ $\sigma_{32} = -f_1 + f_2 + f_5 - f_6 - f_9 + f_{10} + f_{13} - f_{14} + f_{16} - f_{19} - f_{20} + f_{23} + f_{24} - f_{27} - f_{28} + f_{31} - f_{32} + f_{35} + f_{36} - f_{39} - f_{40} + f_{43} + f_{44} - f_{47} - f_{49} + f_{50} + f_{53} - f_{54} + f_{57} - f_{58} + f_{61} + f_{62}$ $\sigma_{33} = -f_1 + f_2 + f_5 - f_6 + f_8 - f_{11} - f_{12} + f_{15} - f_{17} + f_{18} + f_{21} - f_{22} - f_{24} + f_{27} + f_{28} - f_{31} - f_{32} + f_{35} - f_{36} + f_{39} + f_{41} - f_{42} - f_{45} + f_{46} - f_{48} + f_{51} + f_{52} - f_{55} + f_{57} - f_{58} + f_{61} + f_{62}$ $\sigma_{34} = f_0 - f_3 - f_4 + f_7 - f_9 + f_{10} + f_{13} - f_{14} - f_{16} + f_{19} + f_{20} - f_{23} - f_{25} + f_{26} + f_{29} - f_{30} + f_{33} - f_{34} - f_{37} + f_{38} + f_{40} - f_{43} - f_{44} + f_{47} + f_{49} - f_{50} - f_{53} + f_{54} - f_{56} + f_{59} + f_{60} - f_{63}$ $\sigma_{35} = f_0 - f_3 - f_4 + f_7 - f_8 + f_{11} - f_{12} + f_{15} - f_{17} + f_{18} + f_{21} - f_{22} + f_{25} - f_{26} - f_{29} + f_{30} - f_{33} + f_{34} + f_{37} - f_{38} + f_{41} - f_{42} - f_{45} + f_{46} + f_{48} - f_{51} - f_{52} + f_{55} - f_{56} + f_{59} + f_{60} - f_{63}$ $\sigma_{36} = -f_1 + f_2 + f_5 - f_6 + f_8 - f_{11} - f_{12} + f_{15} - f_{16} + f_{19} + f_{20} - f_{23} + f_{25} - f_{26} - f_{29} + f_{30} + f_{33} - f_{34} - f_{37} + f_{38} - f_{40} + f_{43} + f_{44} - f_{47} + f_{48} - f_{51} - f_{52} + f_{55} + f_{57} + f_{58} + f_{61} - f_{62}$ $\sigma_{37} = f_2 - f_3 + f_4 - f_5 - f_9 - f_{11} + f_{12} + f_{14} + f_{16} + f_{18} - f_{21} - f_{23} - f_{24} - f_{25} + f_{30} + f_{31} + f_{32} + f_{33} - f_{38} - f_{39} - f_{40} - f_{42} + f_{45} + f_{47} + f_{49} - f_{51} - f_{52} - f_{54} - f_{58} + f_{59} + f_{60} + f_{61}$ $\sigma_{38} = -f_1 + f_2 - f_5 + f_6 + f_8 - f_{11} + f_{12} - f_{15} - f_{16} + f_{19} + f_{20} + f_{23} + f_{25} + f_{26} - f_{29} - f_{30} - f_{33} - f_{34} + f_{37} + f_{38} + f_{40} + f_{43} + f_{44} - f_{47} - f_{48} + f_{51} + f_{52} + f_{55} + f_{57} - f_{58} + f_{61} - f_{62}$ $\sigma_{39} = f_1 + f_3 - f_4 - f_6 + f_8 - f_{10} + f_{13} - f_{15} - f_{16} + f_{18} - f_{21} + f_{23} - f_{25} - f_{27} + f_{28} + f_{30} - f_{33} - f_{35} + f_{36} + f_{38} - f_{40} + f_{42} - f_{45} + f_{47} + f_{48} - f_{50} + f_{53} - f_{55} + f_{57} + f_{59} - f_{60} - f_{62}$ $\sigma_{40} = f_0 - f_1 + f_6 - f_7 - f_8 + f_{10} - f_{13} + f_{15} + f_{17} - f_{19} + f_{20} - f_{22} - f_{26} - f_{27} + f_{28} + f_{29} + f_{34} + f_{35} - f_{36} - f_{37} - f_{41} + f_{43} - f_{44} + f_{46} + f_{48} - f_{50} + f_{53} - f_{55} - f_{56} + f_{57} + f_{62} + f_{63}$ $\sigma_{41} = f_0 + f_2 - f_5 - f_7 + f_9 - f_{11} + f_{12} - f_{14} - f_{17} + f_{19} - f_{20} + f_{22} - f_{24} - f_{26} + f_{29} + f_{31} - f_{32} - f_{34} + f_{37} + f_{39} + f_{41} + f_{43} - f_{44} + f_{46} + f_{49} - f_{51} + f_{52} - f_{54} + f_{56} + f_{58} + f_{61} - f_{63}$ $\sigma_{42} = f_0 - f_1 - f_2 + f_3 + f_4 - f_5 - f_6 + f_7 - f_8 + f_9 + f_{10} - f_{11} - f_{12} + f_{13} + f_{14} - f_{15} - f_{16} + f_{17} + f_{18} - f_{19} - f_{20} + f_{21} + f_{22} - f_{23} + f_{24} - f_{25} - f_{26} + f_{27} + f_{28} - f_{29} - f_{30} + f_{31} + f_{32} - f_{33} - f_{34} + f_{35} + f_{36} - f_{37} - f_{38} + f_{39} - f_{40} + f_{41} + f_{42} - f_{43} - f_{44} + f_{45} + f_{46} - f_{47} - f_{48} + f_{49} + f_{50} - f_{51} - f_{52} + f_{53} + f_{54} - f_{55} + f_{56} - f_{57} - f_{58} + f_{59} + f_{60} - f_{61} - f_{62} + f_{63}$ $\sigma_{43} = f_0 - f_1 + f_2 - f_3 + f_4 - f_5 + f_6 + f_7 - f_8 - f_9 + f_{10} - f_{11} + f_{12} - f_{13} + f_{14} - f_{15} + f_{16} + f_{17} - f_{18} - f_{19} + f_{20} - f_{21} + f_{22} - f_{23} + f_{24} + f_{25} - f_{26} + f_{27} + f_{28} - f_{29} + f_{30} - f_{31} + f_{32} - f_{33} + f_{34} - f_{35} + f_{36} - f_{37} + f_{38} - f_{39} + f_{40} + f_{41} - f_{42} - f_{43} - f_{44} - f_{45} + f_{46} + f_{47} - f_{48} - f_{49} + f_{50} + f_{51} + f_{52} - f_{53} - f_{54} + f_{55} + f_{56} - f_{57} + f_{58} - f_{59} + f_{60} + f_{61} - f_{62} + f_{63}$ $\sigma_{44} = f_0 - f_1 + f_2 - f_3 - f_4 + f_5 - f_6 + f_7 - f_8 + f_9 - f_{10} + f_{11} + f_{12} - f_{13} + f_{14} - f_{15} - f_{16} + f_{17} - f_{18} + f_{19} + f_{20} - f_{21} + f_{22} - f_{23} + f_{24} - f_{25} + f_{26} - f_{27} - f_{28} + f_{29} -$ -continued $$\sigma_{45} = f_0 + f_1 - f_2 - f_3 - f_4 - f_5 + f_6 + f_7 - f_8 - f_9 + \\ f_{10} + f_{11} + f_{12} + f_{13} - f_{14} - f_{15} - f_{16} - f_{17} + f_{18} + f_{19} + \\ f_{20} + f_{21} - f_{22} - f_{23} + f_{24} + f_{25} - f_{26} - f_{27} - f_{28} - f_{29} + \\ f_{30} + f_{31} + f_{32} + f_{33} - f_{34} - f_{35} - f_{36} + f_{37} + f_{38} + f_{39} - \\ f_{40} - f_{41} + f_{42} + f_{43} + f_{44} + f_{45} - f_{46} - f_{47} - f_{48} - f_{49} + \\ f_{50} + f_{51} + f_{52} + f_{53} - f_{54} - f_{55} + f_{56} + f_{57} - f_{58} - f_{59} - \\ f_{60} - f_{61} + f_{62} + f_{63}$$

$$\sigma_{30} + f_{31} + f_{32} - f_{33} + f_{34} - f_{35} - f_{36} + f_{37} - f_{38} + f_{39} - \\ f_{40} + f_{41} - f_{42} + f_{43} + f_{44} - f_{45} + f_{46} - f_{47} - f_{48} + f_{49} - \\ f_{50} + f_{51} - f_{52} - f_{53} + f_{54} - f_{55} + f_{56} - f_{57} + f_{58} - f_{59} - \\ f_{60} + f_{61} - f_{62} + f_{63}$$

$$\sigma_{46} = f_0 - f_1 - f_2 + f_3 + f_4 - f_5 - f_6 + f_7 + f_8 - f_9 - \\ f_{10} + f_{11} + f_{12} - f_{13} - f_{14} + f_{15} - f_{16} + f_{17} + f_{18} - f_{19} - \\ f_{20} + f_{21} + f_{22} - f_{23} - f_{24} + f_{25} + f_{26} - f_{27} - f_{28} + f_{29} + \\ f_{30} - f_{31} - f_{32} + f_{33} + f_{34} - f_{35} - f_{36} + f_{37} + f_{38} - f_{39} - \\ f_{40} + f_{41} + f_{42} - f_{43} - f_{44} + f_{45} + f_{46} - f_{47} + f_{48} - f_{49} + \\ f_{50} + f_{51} + f_{52} - f_{53} - f_{54} + f_{55} + f_{56} - f_{57} - f_{58} + f_{59} + \\ f_{60} - f_{61} - f_{62} + f_{63}$$

$$\sigma_{47} = f_0 - f_1 - f_2 + f_3 + f_4 - f_5 - f_6 + f_7 - f_8 + f_9 + \\ f_{10} - f_{11} - f_{12} + f_{13} + f_{14} - f_{15} - f_{16} + f_{17} + f_{18} + f_{19} - \\ f_{20} - f_{21} + f_{22} + f_{23} - f_{24} + f_{25} + f_{26} - f_{27} - f_{28} + f_{29} + \\ f_{30} - f_{31} - f_{32} + f_{33} + f_{34} - f_{35} - f_{36} + f_{37} + f_{38} - f_{39} + \\ f_{40} - f_{41} - f_{42} + f_{43} + f_{44} - f_{45} - f_{46} + f_{47} - f_{48} + f_{49} + \\ f_{50} - f_{51} - f_{52} + f_{53} + f_{54} - f_{55} + f_{56} - f_{57} - f_{58} + f_{59} + \\ f_{60} - f_{61} - f_{62} + f_{63}$$

$$\sigma_{48} = f_0 + f_1 - f_2 - f_3 - f_4 - f_5 + f_6 + f_7 + f_8 - f_9 + \\ f_{10} - f_{11} - f_{12} + f_{13} - f_{14} + f_{15} - f_{16} + f_{17} - f_{18} + f_{19} + \\ f_{20} - f_{21} + f_{22} - f_{23} - f_{24} - f_{25} + f_{26} + f_{27} + f_{28} - f_{29} - \\ f_{30} - f_{31} - f_{32} - f_{33} + f_{34} + f_{35} + f_{36} + f_{37} - f_{38} - f_{39} - \\ f_{40} + f_{41} - f_{42} + f_{43} - f_{44} + f_{45} + f_{46} - f_{47} + f_{48} + f_{49} + \\ f_{50} - f_{51} - f_{52} + f_{53} - f_{54} + f_{55} + f_{56} + f_{57} - f_{58} - f_{59} - \\ f_{60} - f_{61} + f_{62} + f_{63}$$

$$\sigma_{49} = f_{24} + f_{25} + f_{26} + f_{27} + f_{28} + f_{29} + f_{30} + f_{31} - f_{32} - \\ f_{33} - f_{34} - f_{35} - f_{36} - f_{37} - f_{38} - f_{39}$$

$$\sigma_{50} = f_{16} + f_{17} + f_{18} + f_{19} + f_{20} + f_{21} + f_{22} + f_{23} - f_{40} - \\ f_{42} - f_{43} - f_{44} - f_{45} - f_{46} - f_{47}$$

$$\sigma_{51} = f_8 + f_9 + f_{10} + f_{11} + f_{12} + f_{13} + f_{14} + f_{15} - f_{48} - \\ f_{49} - f_{50} - f_{51} - f_{52} - f_{53} - f_{54} - f_{55}$$

$$\sigma_{52} = f_0 + f_1 + f_2 + f_3 - f_4 + f_5 + f_6 + f_7 - f_{56} - \\ f_{57} - f_{58} - f_{59} - f_{60} - f_{61} - f_{62} - f_{63}$$

$$\sigma_{53} = f_3 - f_4 + f_{11} - f_{12} + f_{19} - f_{20} + f_{27} - f_{28} + f_{35} - \\ f_{36} + f_{43} - f_{44} + f_{51} + f_{59} - f_{60}$$

$$\sigma_{54} = f_2 - f_5 + f_{10} - f_{13} + f_{18} - f_{21} + f_{26} - f_{29} + f_{34} - \\ f_{37} + f_{42} - f_{45} + f_{50} - f_{53} + f_{58} - f_{61}$$

$$\sigma_{55} = f_1 - f_6 + f_9 - f_{14} + f_{17} - f_{22} + f_{25} - f_{30} + f_{33} - \\ f_{38} + f_{41} - f_{46} + f_{49} - f_{54} + f_{57} - f_{62}$$

$$\sigma_{56} = f_0 - f_7 + f_8 - f_{15} + f_{16} - f_{23} + f_{24} - f_{31} + f_{32} - \\ f_{39} + f_{40} - f_{47} + f_{48} - f_{55} + f_{56} - f_{63}$$

$$\sigma_{57} = f_8 + f_9 + f_{10} + f_{11} + f_{12} + f_{13} + f_{14} + f_{15} - f_{16} - \\ f_{17} - f_{18} - f_{19} - f_{20} - f_{21} - f_{22} - f_{23} - f_{40} - f_{41} - f_{42} - \\ f_{43} - f_{44} - f_{45} - f_{46} - f_{47} + f_{48} + f_{49} + f_{50} + f_{51} + f_{52} + \\ f_{53} + f_{54} + f_{55}$$

$$\sigma_{58} = f_0 + f_1 + f_2 + f_3 + f_4 + f_5 + f_6 + f_7 - f_{24} - \\ f_{25} - f_{26} - f_{27} - f_{28} - f_{29} - f_{30} - f_{31} - f_{32} - f_{33} - f_{34} - \\ f_{35} - f_{36} - f_{37} - f_{38} - f_{39} + f_{56} + f_{57} + f_{58} + f_{59} + f_{60} + \\ f_{61} + f_{62} + f_{63}$$

$$\sigma_{59} = f_1 - f_2 - f_5 + f_6 + f_9 - f_{10} - f_{13} + f_{14} + f_{17} - \\ f_{18} - f_{21} + f_{22} + f_{25} - f_{26} - f_{29} + f_{30} + f_{33} - f_{34} - f_{37} + \\ f_{38} + f_{41} - f_{42} - f_{45} + f_{46} + f_{49} - f_{50} - f_{53} + f_{54} + f_{57} - \\ f_{58} - f_{61} + f_{62}$$

$$\sigma_{60} = f_0 - f_3 - f_4 + f_7 + f_8 - f_{11} - f_{12} + f_{15} + f_{16} - \\ f_{19} - f_{20} + f_{23} + f_{24} - f_{27} - f_{28} + f_{31} + f_{32} - f_{35} - f_{36} + \\ f_{39} + f_{40} - f_{43} - f_{44} + f_{47} + f_{48} - f_{51} - f_{52} + f_{55} + f_{56} - \\ f_{59} - f_{60} + f_{63}$$

$$\sigma_{61} = f_0 + f_1 + f_2 + f_3 + f_4 + f_5 + f_6 + f_7 - f_8 - f_9 - \\ f_{10} - f_{11} - f_{12} - f_{13} - f_{14} - f_{15} - f_{16} - f_{17} - f_{18} - f_{19} - \\ f_{20} - f_{21} - f_{22} - f_{23} + f_{24} + f_{25} + f_{26} + f_{27} + f_{28} + f_{29} - \\ f_{30} + f_{31} + f_{32} + f_{33} + f_{34} + f_{35} + f_{36} + f_{37} + f_{38} + f_{39} - \\ f_{40} - f_{41} - f_{42} - f_{43} - f_{44} - f_{45} - f_{46} - f_{47} - f_{48} - f_{49} - \\ f_{50} - f_{51} - f_{52} - f_{53} - f_{54} - f_{55} + f_{56} + f_{57} + f_{58} + f_{59} + \\ f_{60} + f_{61} + f_{62} + f_{63}$$

$$\sigma_{62} = f_0 - f_1 - f_2 + f_3 + f_4 - f_5 - f_6 + f_7 + f_8 - f_9 - \\ f_{10} + f_{11} + f_{12} - f_{13} - f_{14} + f_{15} + f_{16} - f_{17} - f_{18} + f_{19} + \\ f_{20} - f_{21} - f_{22} + f_{23} + f_{24} - f_{25} - f_{26} + f_{27} + f_{28} - f_{29} - \\ f_{30} + f_{31} + f_{32} - f_{33} - f_{34} + f_{35} + f_{36} - f_{37} - f_{38} + f_{39} - \\ f_{40} + f_{41} - f_{42} + f_{43} + f_{44} - f_{45} - f_{46} + f_{47} + f_{48} - f_{49} + \\ f_{50} + f_{51} + f_{52} - f_{53} - f_{54} + f_{55} + f_{56} - f_{57} - f_{58} + f_{59} + \\ f_{60} - f_{61} - f_{62} + f_{63}$$

$$\sigma_{63} = f_0 + f_1 + f_2 + f_3 + f_4 + f_5 + f_6 + f_7 + f_8 + f_9 + \\ f_{10} + f_{11} + f_{12} + f_{13} + f_{14} + f_{15} + f_{16} + f_{17} + f_{18} + f_{19} + \\ f_{20} + f_{21} + f_{22} + f_{23} + f_{24} + f_{25} + f_{26} + f_{27} + f_{28} + f_{29} + \\ f_{30} + f_{31} + f_{32} + f_{33} + f_{34} + f_{35} + f_{36} + f_{37} + f_{38} + f_{39} + \\ f_{40} + f_{41} + f_{42} + f_{43} + f_{44} + f_{45} + f_{46} + f_{47} + f_{48} + f_{49} + \\ f_{50} + f_{51} + f_{52} + f_{53} + f_{54} + f_{55} + f_{56} + f_{57} + f_{58} + f_{59} + \\ f_{60} + f_{61} + f_{62} + f_{63}$$

These transform coefficients are accessed using input accumulator read addresses. After the forward transform coefficient vectors are calculated, these transform coefficient vectors are used to generate the FDCT frequency matrix using the forward transform equations as follows, where $r_i = c_i \ast c_4$.

$F_0 = c_0 \cdot \sigma_{63}$ $F_1 = r_1 \cdot \sigma_{56} + r_3 \cdot \sigma_{55} + r_5 \cdot \sigma_{54} + r_7 \cdot \sigma_{53}$ $F_2 = r_2 \cdot \sigma_{60} + r_6 \cdot \sigma_{59}$ $F_3 = -r_1 \cdot \sigma_{54} + r_3 \cdot \sigma_{56} - r_5 \cdot \sigma_{53} - r_7 \cdot \sigma_{55}$ $F_4 = r_4 \cdot \sigma_{62}$ $F_5 = -r_1 \cdot \sigma_{55} + r_3 \cdot \sigma_{53} + r_5 \cdot \sigma_{56} + r_7 \cdot \sigma_{54}$ $F_6 = -r_2 \cdot \sigma_{59} + r_6 \cdot \sigma_{60}$ $F_7 = -r_1 \cdot \sigma_{53} + r_3 \cdot \sigma_{54} - r_5 \cdot \sigma_{55} + r_7 \cdot \sigma_{56}$ $F_8 = r_1 \cdot \sigma_{52} + r_3 \cdot \sigma_{51} + r_5 \cdot \sigma_{50} + r_7 \cdot \sigma_{49}$ $F_9 = c_0 \cdot \sigma_0 + c_2 \cdot \sigma_{13} + c_4 \cdot \sigma_{14} + c_6 \cdot \sigma_{15}$ $F_{10} = c_1 \cdot \sigma_{16} + c_3 \cdot \sigma_{17} + c_5 \cdot \sigma_{18} + c_7 \cdot \sigma_{19}$ $F_{11} = c_0 \cdot \sigma_1 + c_2 \cdot \sigma_{21} + c_4 \cdot \sigma_{22} + c_6 \cdot \sigma_{23}$ $F_{12} = c_1 \cdot \sigma_4 + c_3 \cdot \sigma_7 + c_5 \cdot \sigma_6 + c_7 \cdot \sigma_5$ $F_{13} = c_0 \cdot \sigma_2 + c_2 \cdot \sigma_{29} + c_4 \cdot \sigma_{30} + c_6 \cdot \sigma_{31}$ $F_{14} = c_1 \cdot \sigma_{32} + c_3 \cdot \sigma_{33} + c_5 \cdot \sigma_{34} + c_7 \cdot \sigma_{35}$ $F_{15} = c_0 \cdot \sigma_3 + c_2 \cdot \sigma_{37} + c_4 \cdot \sigma_{38} + c_6 \cdot \sigma_{40}$ $F_{16} = r_2 \cdot \sigma_{58} + r_6 \cdot \sigma_{57}$ $F_{17} = c_1 \cdot \sigma_{12} + c_3 \cdot \sigma_{41} + c_5 \cdot \sigma_{39} + c_7 \cdot \sigma_{20}$ $F_{18} = c_0 \cdot \sigma_{24} + c_4 \cdot \sigma_{48}$ $F_{19} = c_1 \cdot \sigma_{25} + c_3 \cdot \sigma_{26} + c_5 \cdot \sigma_{27} + c_7 \cdot \sigma_{28}$ $F_{20} = c_2 \cdot \sigma_{46} + c_6 \cdot \sigma_{47}$ $F_{21} = c_1 \cdot \sigma_{28} + c_3 \cdot \sigma_{27} - c_5 \cdot \sigma_{26} + c_7 \cdot \sigma_{25}$ $F_{22} = c_0 \cdot \sigma_{36} + c_4 \cdot \sigma_{43}$ $F_{23} = c_1 \cdot \sigma_{20} - c_3 \cdot \sigma_{39} + c_5 \cdot \sigma_{41} - c_7 \cdot \sigma_{12}$ $F_{24} = -r_1 \cdot \sigma_{50} + r_3 \cdot \sigma_{52} - r_5 \cdot \sigma_{49} - r_7 \cdot \sigma_{51}$ $F_{25} = -c_0 \cdot \sigma_2 + c_2 \cdot \sigma_{31} + c_4 \cdot \sigma_{30} - c_6 \cdot \sigma_{29}$ $F_{26} = c_1 \cdot \sigma_{34} - c_3 \cdot \sigma_{32} + c_5 \cdot \sigma_{35} + c_7 \cdot \sigma_{33}$ $F_{27} = c_0 \cdot \sigma_0 - c_2 \cdot \sigma_{15} - c_4 \cdot \sigma_{14} + c_6 \cdot \sigma_{13}$ $F_{28} = c_1 \cdot \sigma_6 - c_3 \cdot \sigma_4 + c_5 \cdot \sigma_5 + c_7 \cdot \sigma_7$ $F_{29} = c_0 \cdot \sigma_3 + c_2 \cdot \sigma_{40} + c_4 \cdot \sigma_{38} - c_6 \cdot \sigma_{37}$ $F_{30} = -c_1 \cdot \sigma_{18} + c_3 \cdot \sigma_{16} - c_5 \cdot \sigma_{19} - c_7 \cdot \sigma_{17}$ $F_{31} = -c_0 \cdot \sigma_1 + c_2 \cdot \sigma_{23} + c_4 \cdot \sigma_{22} - c_6 \cdot \sigma_{21}$ $F_{32} = r_4 \cdot \sigma_{61}$ $F_{33} = c_1 \cdot \sigma_8 + c_3 \cdot \sigma_{10} + c_5 \cdot \sigma_{11} + c_7 \cdot \sigma_9$ $F_{34} = c_2 \cdot \sigma_{45} + c_6 \cdot \sigma_{44}$ $F_{35} c_1 \cdot \sigma_{11} - c_3 \cdot \sigma_8 + c_5 \cdot \sigma_9 + c_7 \cdot \sigma_{10}$ $F_{36} = c_0 \cdot \sigma_{42}$ $F_{37} = c_1 \cdot \sigma_{10} - c_3 \cdot \sigma_9 - c_5 \cdot \sigma_8 - c_7 \cdot \sigma_{11}$ $F_{38} = c_2 \cdot \sigma_{44} - c_6 \cdot \sigma_{45}$ $F_{39} = -c_1 \cdot \sigma_9 + c_3 \cdot \sigma_{11} - c_5 \cdot \sigma_{10} + c_7 \cdot \sigma_8$ $F_{40} = -r_1 \cdot \sigma_{51} + r_3 \cdot \sigma_{49} + r_5 \cdot \sigma_{52} + r_7 \cdot \sigma_{50}$ $F_{41} = -c_0 \cdot \sigma_1 - c_2 \cdot \sigma_{23} + c_4 \cdot \sigma_{22} + c_6 \cdot \sigma_{21}$ $F_{42} = -c_1 \cdot \sigma_{33} + c_3 \cdot \sigma_{35} + c_5 \cdot \sigma_{32} + c_7 \cdot \sigma_{34}$ $F_{43}=c_0\cdot\sigma_3+c_2\cdot\sigma_{40}-c_4\cdot\sigma_{38}-c_6\cdot\sigma_{37}$ $F_{44}=c_1\cdot\sigma_7-c_3\cdot\sigma_5-c_5\cdot\sigma_4-c_7\cdot\sigma_6$ $F_{45}=c_0\cdot\sigma_0+c_2\cdot\sigma_{15}-c_4\cdot\sigma_{14}-c_6\cdot\sigma_{13}$ $F_{46}=c_1\cdot\sigma_{17}-c_3\cdot\sigma_{19}-c_5\cdot\sigma_{16}-c_7\cdot\sigma_{18}$ $F_{47}=c_0\cdot\sigma_2+c_2\cdot\sigma_{31}-c_4\cdot\sigma_{30}-c_6\cdot\sigma_{29}$ $F_{48}=-r_2\cdot\sigma_{57}+r_6\cdot\sigma_{58}$ $F_{49}=-c_1\cdot\sigma_{26}+c_3\cdot\sigma_{28}+c_5\cdot\sigma_{25}+c_7\cdot\sigma_{27}$ $F_{50}=-c_0\cdot\sigma_{36}+c_4\cdot\sigma_{43}$ $F_{51}=-c_1\cdot\sigma_{39}+c_3\cdot\sigma_{12}-c_5\cdot\sigma_{20}-c_7\cdot\sigma_{41}$ $F_{52}=c_2\cdot\sigma_{47}-c_6\cdot\sigma_{46}$ $F_{53}=c_1\cdot\sigma_{41}-c_3\cdot\sigma_{20}-c_5\cdot\sigma_{12}-c_7\cdot\sigma_{39}$ $F_{54}=c_0\cdot\sigma_{24}-c_4\cdot\sigma_{48}$ $F_{55}=c_1\cdot\sigma_{27}-c_3\cdot\sigma_{25}+c_5\cdot\sigma_{28}+c_7\cdot\sigma_{26}$ $F_{56}=-r_1\cdot\sigma_{49}+r_3\cdot\sigma_{50}-r_5\cdot\sigma_{51}+r_7\cdot\sigma_{52}$ $F_{57}=-c_0\cdot\sigma_3+c_2\cdot\sigma_{37}-c_4\cdot\sigma_{38}+c_6\cdot\sigma_{40}$ $F_{58}=c_1-c_3\cdot\sigma_{18}+c_5\cdot\sigma_{17}-c_7\cdot\sigma_{16}$ $F_{59}=c_0\cdot\sigma_2-c_2\cdot\sigma_{29}+c_4\cdot\sigma_{30}-c_6\cdot\sigma_{31}$ $F_{60}=-c_1\cdot\sigma_5+c_3\cdot\sigma_6-c_5\cdot\sigma_7+c_7\cdot\sigma_4$ $F_{61}=-c_0\cdot\sigma_1+c_2\cdot\sigma_{21}-c_4\cdot\sigma_{22}+c_6\cdot\sigma_{23}$ $F_{62}=c_1\cdot\sigma_{35}-c_3\cdot\sigma_{34}+c_5\cdot\sigma_{33}-c_7\cdot\sigma_{32}$ $F_{63}=c_0\cdot\sigma_0-c_2\cdot\sigma_{13}+c_4\cdot\sigma_{14}-c_6\cdot\sigma_{15}$ Accordingly, using this process, a spacial matrix of data elements is provided to input accumulators 52, which calculate the forward transform coefficients. DSP 62 retrieves the forward transform coefficients and multiplies the forward transform coefficients by the constants $c_0$ to $c_7$ and $r_0$ to $r_7$ to generate transform products. The multiplications are performed sequentially using the transform coefficients and constants as they are stored in the first and second data memory. Output accumulators 54 retrieve the transform coefficients and calculate the frequency matrix of data elements.

More specifically, referring to FIGS. 1 and 2, input accumulator circuits 52 and output accumulator circuits 54 are memory mapped to occupy 704 locations of address space in DSP 62. Input accumulator circuits 52 are accessed using 64 input accumulator write addresses ($II_0$ to $II_{63}$), input accumulator circuits 52 are accessed using input accumulator read addresses ($IC_0$ to $IC_{63}$), output accumulator circuits 54 are accessed using 512 (8*64) output accumulator write addresses ($OI_0^0$ to $OI_{63}^7$) and output accumulator circuits 54 are accessed using output accumulator write addresses ($OC_0$ to $OC_{63}$). Two additional addresses, an input clear address (ICA) and an output clear address (OCA) are used to generate clear signals to the input accumulator circuits and the output accumulator circuits, respectively. The input accumulator read addresses, IC, which store the transform coefficients, and the output accumulator write addresses, OI, are distributed within the DSP memory space such that these addresses may be sequentially accessed when DSP 62 is performing the multiplication portion of the DCT.

When operating DCT engine 50, a plurality of transform coefficients are generated by accumulating the input matrix of data, a plurality of transform products are generated by multiplying the transform coefficients by transform constants and the plurality of transform products are accumulated to produce the transformed matrix. The transform coefficients are available at the input accumulator write addresses substantially simultaneously but are stored within the memory of DSP 62 in a distributed order such that they may be accessed by DSP 62 using sequential addressing. Additionally, the transform products are generated by DSP 62 such that the transform products may be stored in the DSP memory using sequential addressing.

When initiating a DCT, the processor clears all input accumulator circuits by writing to the ICA address and clears all output accumulator circuits by writing to the OCA address. Next, DCT engine 50 retrieves the pixel matrix to the appropriate addresses $II_0$ to $II_{63}$. While this is occurring, IAdd(0)–IAdd(63) form the transform coefficients $\sigma_0$–$\sigma_{63}$. The processor then reads the transform coefficient $\sigma_{13}$ from IAdd(0) via the address $IC_{13}$ and loads this transform coefficient into the appropriate processor memory location so that sequential addressing may access this value. Using this transform coefficient in combination with the other transform coefficients as well as the transform constants, the processor which is coupled to I/O bus 60 generates the transform product values. These product values are stored within the memory of the processor using sequential addressing. The product values are read by the output accumulator circuits using the appropriate output accumulator write address. For example, $c_7\cdot\sigma_{63}$ is written to address $OI_{63}^7$. Accordingly, address selection unit 72 for the output accumulation circuits which require this transform product value monitor this address to add or subtract this value. The transformed output for location 0, which is produced by OAdd(0) is then provided to output address $OC_0$.

The sequential addressing aspect of the multiplication is determined by using the multiplication distribution of constants and transform coefficients set forth in FIG. 4. This distribution is based upon the distribution of constants and transform coefficients in the forward transform equations. By using this distribution of constants and transform coefficients, the constants, transform coefficients, and transform products are stored according the memory distribution set forth in FIGS. 5A and 5B, thus allowing DSP 62 to perform the operations using sequential addressing. Because any processing that uses the transformed matrix of data uses the data in the order that is set forth by the arrow in FIG. 3, the arrangement in memory of the output matrix of data, F, corresponds to the order set forth by the FIG. 3 arrow.

Figure 6:
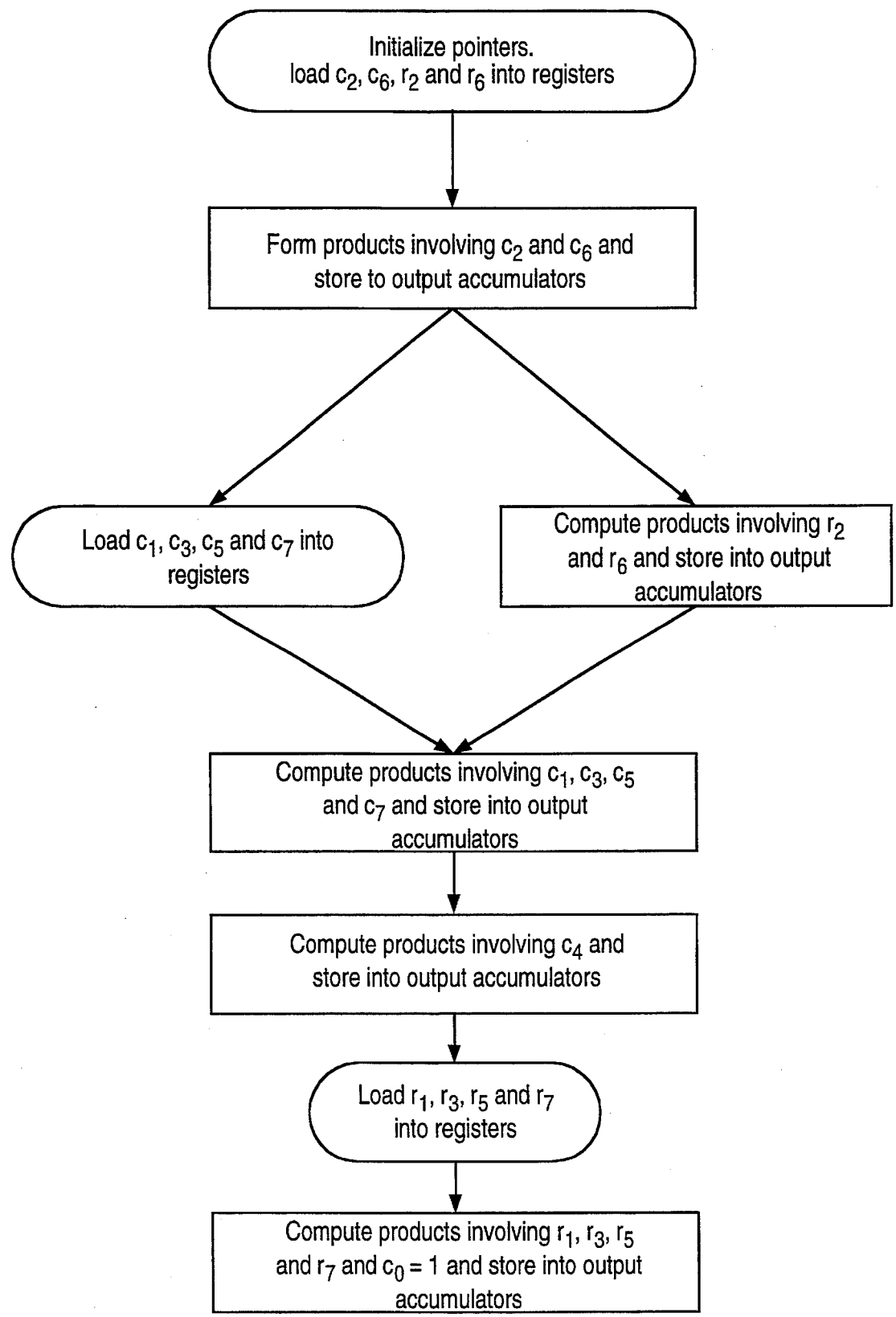
FIG. 6 shows a flow chart of the process of performing the multiplication portion of a forward DCT using a DSP.

More specifically, the forward transform multiplications for generating the transform products are implemented by manipulating the transform coefficients and transform constants in accordance with the flow chart set forth in FIG. 6. The implementation of this process for DSP 62 is set forth in Table 1.

TABLE 2

FDCT:
dp0 = fdct_x;
dp4 = fdct_y
r4 = *dp0 ++;
r0 = *dp0 ++                     r1 = *dp4 ++                              //r4 = signal 3'0
r6 = r4h * r0h r7 = *dp0 ++      r5 = *dp4 ++                              //r0 = c__2'0,r1 = c__6'0
loop 12 {;                                                                 //r7 = r__2'0,r5 = r__6'0
    r6 = r4h * r1h                  *dp4 ++ = r6h;

TABLE 2-continued

```
    r6 = r4h * r0h r4 = *dp0 ++     *dp4 ++ = r6h;
    ;                               //r4 = sigma-15,21,23,29,31,37,40,44,45,46,47,57
};
r6 = r4h * r7h r2 = *dp0 ++         *dp4 ++ = r6h;                         //r3 = c__7'0; r4 = sigma 57'0
r6 = r4h * r5h *dp0 ++ = r6h        r4 = *dp4 ++;                          //r4 = sigma 58'0
r6 = r4h * r7h *dp0 ++ = r6h        r2 = *dp4 ++;                          //r2 = c__5'0
r6 = r4h * r5h r4 = *dp0 ++         r0 = *dp4 ++;                          //r4 = sigma 59'0 r0 = c__1'0
r6 = r4h * r7h *dp0 ++ = r6h        r1 = *dp4 ++;                          //r1 = c__3'0
r6 = r4h * r5h *dp0 ++ = r6h        r4 = *dp4 ++;                          //r4 = sigma 60
r6 = r4h * r7h *dp0 ++ = r6h        r7 = *dp4 ++;                          //r7 = c__4'0
r6 = r4h * r5h *dp0 ++ = r6h        r4 = *dp4 ++;                          //r4 = sigma 4'0
loop 23 {;
    r6 = r4h * r0h *dp0 ++ = r6h
    r6 = r4h * r1h *dp0 ++ = r6h
    r6 = r4h * r2h *dp0 ++ = r6h
    r6 = r4h * r3h *dp0 ++ = r6h    r4 = *dp4 ++;
    ;                               //r4 = sigma-4,5,6,7,8,9,10,11,12,16,17,18,19,
    ;                               //     20,25,26,27,28,32,33,34,35,39,41,14
};
rep 6;
    r6 = r4h * r7h *dp0 ++ = r6h    r4 = *dp4 ++;
    ;                                                                      //r4 = sigma-22,30,38,43,48,49
                                    r1 = *dp4 ++;       r3 = *dp4 ++;      //r1 = r__1; r3 = r__3
                                    r5 = *dp0 ++        r7 = *dp4 ++;      //r5 = r__5; r7 = r__7
loop 8 {;
    r6 = r4h * r1h r0 = *dp0 ++     *dp4 ++ = r6h;                         //r0 = sigma-0,1,2,3,24,36,42,63
    r6 = r4h * r3h *dp0 ++ = r0h    *dp4 ++ = r6h;
    r6 = r4h * r5h                  *dp4 ++ = r6h;
    r6 = r4h * r7h r4 = *dp0 ++     *dp4 ++ = r6h;
    ;                                                                      //r4 = sigma-50,51,52,53,54,55,56,61
};
                                    r1 = *dp0 ++              *dp4 ++ = r4h;    //r1 = sigma 62'0
                                                        *dp4 ++ = r1h;
```

Output accumulators 54 retrieve the transform products as these products are stored within the DSP memory. Output accumulators 54 then accumulate the transform products and provide a frequency matrix of data elements to the output accumulator write addresses; the frequency matrix of data elements is the forward DCT of the input spacial data matrix.

Figure 3:
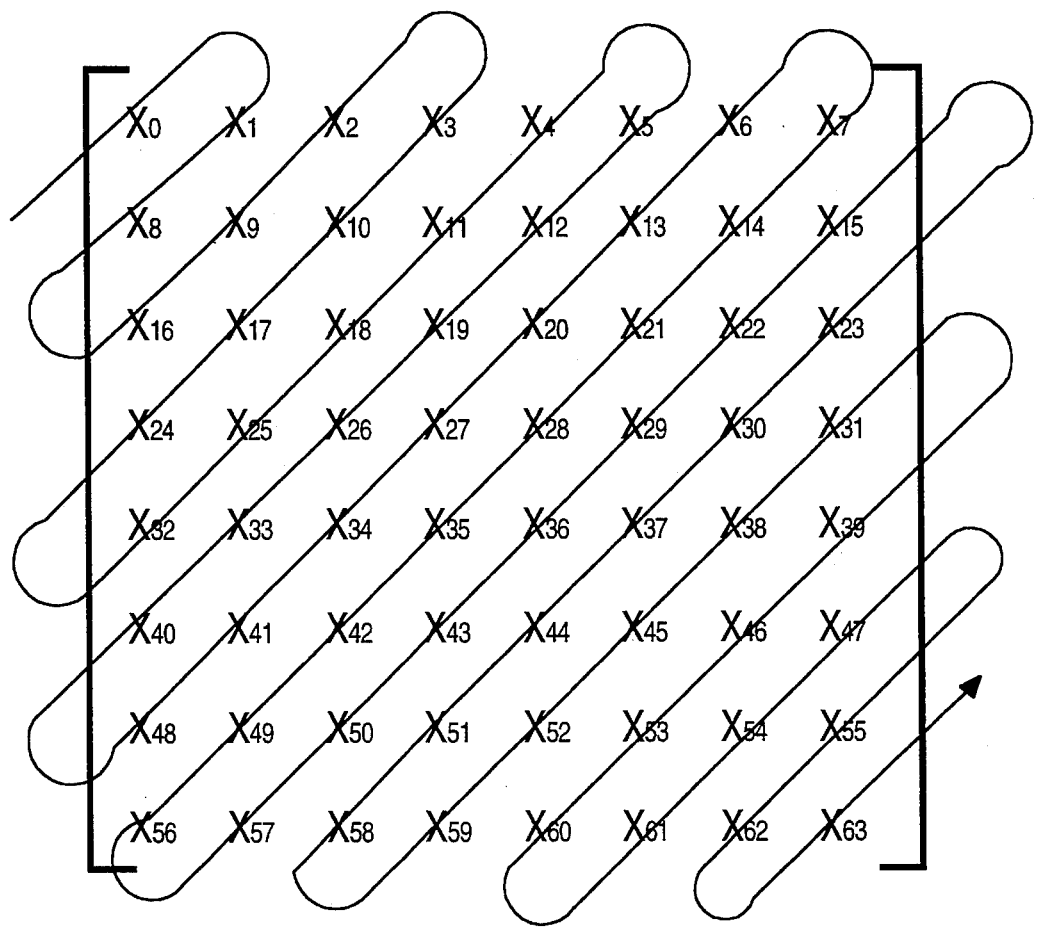
FIG. 3 shows an example of a matrix of data on which a DCT is performed.

DCT engine 50 interacts with the two buses of I/O bus 60 with each clock signal. The input data elements are ordered by rows left to right across the data matrix. However, the output data elements are ordered diagonally in conformance with the above-mentioned JPEG specifications. The arrowed line in FIG. 3 shows the order in which the output data elements are provided.

DCT engine 50 uses input accumulators 52 and output accumulators 54 to perform the many calculations of a FDCT in parallel. These calculations are divided into discrete calculations which are performed during different cycles. DSP 62, which performs the multiplication portion of the transform, may perform two memory operations with each clock cycle. It takes a total of 174 cycles to perform the multiplication portion of the transform. Individual input accumulators 52 and output accumulators 54 maintain running totals as each new entry is accumulated during a cycle. After the value which an accumulator is calculating is complete, that value is provided to the corresponding input accumulator read address or output accumulator write address.

Examples of the individual cycles of the multiplication portion of the FDCT, which are performed by DSP 62 using the process in Table 1, are now discussed in detail. The remaining cycles of this process are similar to the examples set forth below.

During cycle 1, the data pointer dp0 is initialized. A characteristic of the DSP 62 is that data pointers dp0–dp3 reference X data memory. The transform coefficient $\sigma_{13}$ is held at this X data memory location. Next, during cycle 2, the data pointer dp4 is initialized. A characteristic of DSP 62 is that data pointers dp4–dp7 reference Y data memory. The constant $c_6$ is held at this Y data memory location.

During cycle 3, the 40-bit general register r4 is loaded with $\sigma_{13}$ by de-referencing and auto incrementing data pointer dp0 so that data pointer dp0 now points to $c_6$. During cycle 4, the 40-bit general register r0 is loaded with c2 by de-referencing and auto-incrementing dp0 so that dp0 points to r2. Additionally, the 40-bit general register r1 is loaded with c6 by de-referencing and auto incrementing dp4 so that data pointer dp4 now points to r6.

During cycle 5, the product of $\sigma_{13}$, which is stored in register r4, and c2, which is stored in register r0, is calculated and stored in register r6. Additionally, register r7 is loaded with the constant r2 by de-referencing and auto-incrementing data pointer dp0 so that data pointer dp0 points to $\sigma_{15}$. Additionally, register r5 is loaded with the constant value $r_6$ by de-referencing and auto-incrementing data pointer dp4 so that data pointer dp4 points to $OI_{13}^2$. During cycles 6 and 7 the looping function is initialized.

During cycle 8, the product of $\sigma_{13}$, which is stored in register r4, and $c_6$, which is stored in register r1, is calculated and stored in register r6. Additionally, the value of $\sigma_{13} \cdot c_2$, which is stored in register r6, is stored by de-referencing and auto-incrementing data pointer dp4 so that data pointer dp4 points to $OI_{13}^6$.

During cycle 9, the product of $\sigma_{13}$, which is stored in register r4, and c2, which is stored in register r0, is calculated and stored in register r6. Additionally, register r4 is loaded with $\sigma_{15}$ by de-referencing and auto-incrementing data pointer dp0 so that data pointer dp0 points to $\sigma_{21}$. Additionally, the value of $\sigma_{13} \cdot c_6$, which is stored in register r6, is stored by de-referencing and auto-incrementing data pointer dp4 so that data pointer dp4 points to $OI_{15}^2$.

During cycles 10–31, the instructions for cycles 8 and 9 are repeated to calculate and store: $\sigma_{15} \cdot c_2$ and $\sigma_{15} \cdot c_6$; $\sigma_{21} \cdot c_2$ and $\sigma_{21} \cdot c_6$; $\sigma_{23} \cdot c_2$ and $\sigma_{23} \cdot c_6$; $\sigma_{29} \cdot c_2$ and $\sigma_{29} \cdot c_6$; $\sigma_{31} \cdot c_2$ and $\sigma_{31} \cdot c_6$; $\sigma_{37} \cdot c_2$ and $\sigma_{37} \cdot c_6$; $\sigma_{40} \cdot c_2$ and $\sigma_{40} \cdot c_6$; $\sigma_{44} \cdot c_2$ and $\sigma_{44} \cdot c_6$; $\sigma_{45} \cdot c_2$ and $\sigma_{45} \cdot c_6$; and, $\sigma_{46} \cdot c_2$ and $\sigma_{46} \cdot c_6$. At the conclusion of this loop, register r4 holds the transform coefficient $\sigma_{57}$ and the registers r7 and r5 hold the constants $r_2$ and $r_6$, respectively. Accordingly, the information which is stored in the memories of DSP 62 is arranged for calculating the products indicated by the last column of FIG. 4.

The computation of the IDCT according to the present invention is set forth as follows. As with the FDCT, notation for the matrix of data is indexed as a singly indexed vector as represented by the subscripts of X in FIG. 2. The first step in the IDCT is calculating the inverse transform coefficient vectors $\tau_0$ to $\tau_{63}$ as follows.

$\tau_0 = F_0/2 + F_9 + F_{18} + F_{27} + F_{36} + F_{45} + F_{54} + F_{63}$ $\tau_1 = F_0/2 - F_{13} - F_{22} + F_{25} - F_{36} - F_{47} + F_{50} - F_{59}$ $\tau_2 = F_0/2 - F_9 + F_{18} - F_{27} + F_{36} - F_{45} + F_{54} - F_{63}$ $\tau_3 = F_0/2 + F_{13} - F_{22} - F_{25} - F_{36} + F_{47} + F_{50} + F_{59}$ $\tau_4 = F_0/2 + F_{11} + F_{22} - F_{31} - F_{36} - F_{41} - F_{50} - F_{61}$ $\tau_5 = F_0/2 + F_{15} - F_{18} - F_{29} + F_{36} + F_{43} - F_{54} - F_{57}$ $\tau_6 = F_0/2 - F_{11} + F_{22} + F_{31} - F_{36} - F_{41} - F_{50} + F_{61}$ $\tau_7 = F_0/2 - F_{15} - F_{18} + F_{29} + F_{36} - F_{43} - F_{54} + F_{57}$ $\tau_8 = c_4 \cdot F_1 + c_4 \cdot F_8 + F_{10} + F_{17} + F_{19} + F_{26} + F_{28} + F_{35} + F_{37} + F_{44} + F_{46} + F_{53} + F_{55} + F_{62}$ $\sigma_9 = -c_4 \cdot F_5 + c_4 \cdot F_8 - F_{14} + F_{17} - F_{21} - F_{28} - F_{30} + F_{33} - F_{39} + F_{42} - F_{44} - F_{51} - F_{55} - F_{58}$ $\tau_{10} = -c_4 \cdot F_6 + F_9 - F_{13} + c_4 \cdot F_{16} - F_{20} - F_{29} - F_{31} + F_{34} - F_{38} + F_{41} - F_{43} - F_{52} + F_{59} - F_{63}$ $\tau_{11} = c_4 \cdot F_1 - F_{12} - F_{14} - F_{21} - F_{23} + c_4 \cdot F_{24} + F_{26} - F_{35} - F_{37} - F_{46} + F_{49} + F_{51} - F_{58} - F_{60}$ $\tau_{12} = -c_4 \cdot F_4 + F_9 - F_{15} + F_{18} - F_{22} - F_{27} - F_{29} + c_4 \cdot F_{32} + F_{43} - F_{45} - F_{50} - F_{54} + F_{57} + F_{63}$ $\tau_{13} = -c_4 \cdot F_7 + F_{10} - F_{12} + F_{17} - F_{19} - F_{30} + F_{35} - F_{37} + c_4 \cdot F_{40} - F_{42} - F_{53} + F_{55} + F_{60} - F_{62}$ $\tau_{14} = c_4 \cdot F_2 - F_{11} - F_{15} - F_{20} + F_{25} + F_{27} - F_{34} - F_{38} - F_{45} + f_{47} + c_4 \cdot F_{48} + F_{52} + F_{57} - F_{61}$ $\tau_{15} = -c_4 \cdot F_3 + F_{10} + F_{19} - F_{23} - F_{26} - F_{28} + F_{33} + F_{39} + F_{44} - F_{46} - F_{49} - F_{53} + c_4 \cdot F_{56} + F_{62}$ $\tau_{16} = C_4 \cdot F_7 + F_{14} + F_{21} - F_{23} + F_{28} - F_{30} + F_{35} - F_{37} + F_{42} - F_{44} + F_{49} - F_{51} + c_4 \cdot F_{56} - F_{58}$ $\tau_{17} = -c_4 \cdot F_3 + c_4 \cdot F_{10} + F_{14} - F_{19} + F_{23} - F_{28} + F_{30} + F_{33} + F_{39} - F_{42} - F_{44} + F_{49} + F_{53} - F_{58}$ $\tau_{18} = -c_4 \cdot F_6 - F_{11} + F_{15} + c_4 \cdot F_{16} - F_{20} + F_{25} - F_{27} - F_{34} + F_{38} + F_{45} + F_{47} - F_{52} + F_{57} + F_{61}$ $\tau_{19} = c_4 \cdot F_7 - F_{12} + F_{14} + F_{17} - F_{19} + c_4 \cdot F_{24} - F_{26} - F_{35} + F_{37} + F_{46} - F_{53} + F_{55} + F_{58} + F_{60}$ $\tau_{20} = -c_4 \cdot F_4 + F_9 + F_{15} - F_{18} + F_{22} - F_{27} - F_{29} + c_4 \cdot F_{32} - F_{43} - F_{45} + F_{50} + F_{54} + F_{57} + F_{63}$ $\tau_{21} = c_4 \cdot F_1 - F_{10} - F_{12} + F_{21} + F_{23} + F_{30} - F_{35} - F_{37} + c_4 \cdot F_{40} + F_{42} - F_{49} - F_{51} + F_{60} + F_{62}$ $\tau_{22} = -c_4 \cdot F_2 + F_9 + F_{13} - F_{20} - F_{29} + F_{31} + F_{34} + F_{38} - F_{41} - F_{43} + c_4 \cdot F_{48} + F_{52} - F_{59} - F_{63}$ $\tau_{23} = +c_4 \cdot F_5 - F_{10} + F_{17} - F_{21} - F_{26} - F_{28} - F_{33} + F_{39} + F_{44} - F_{46} - F_{51} - F_{55} + c_4 \cdot F_{56} - F_{62}$ $\tau_{24} = c_4 \cdot F_6 + F_{13} + F_{15} + F_{20} + F_{27} - F_{31} + F_{34} - F_{38} + F_{41} - F_{45} + c_4 \cdot F_{48} - F_{52} + F_{57} - F_{59}$ $\tau_{25} = -c_4 \cdot F_7 + c_4 \cdot F_8 - F_{10} + F_{21} - F_{23} - F_{26} + F_{28} - F_{35} + F_{37} + F_{44} - F_{46} + F_{49} - F_{51} - F_{62}$ $\tau_{26} = -c_4 \cdot F_2 + F_{13} - F_{15} + c_4 \cdot F_{16} + F_{20} - F_{27} - F_{31} - F_{34} - F_{38} + F_{41} + F_{45} + F_{52} - F_{57} + F_{59}$ $\tau_{27} = c_4 \cdot F_5 - F_{10} \quad F_{12} - F_{19} - F_{23} + c_4 \cdot F_{24} - F_{30} + F_{33} - F_{39} - F_{42} - F_{49} + F_{53} + F_{60} + F_{62}$ $\tau_{28} = c_4 \cdot F_4 - F_{11} + F_{13} - F_{18} - F_{22} + F_{25} - F_{31} + c_4 \cdot F_{32} - F_{41} - F_{47} - F_{50} + F_{54} + F_{59} + F_{61}$ $\tau_{29} = -c_4 \cdot F_3 + F_{12} - F_{14} + F_{17} + F_{21} - F_{26} - F_{33} - F_{39} + c_4 \cdot F_{40} + F_{46} + F_{51} - F_{55} - F_{58} - F_{60}$ $\tau_{30} = -c_4 \cdot F_6 + F_9 - F_{11} + F_{20} - F_{25} + F_{29} - F_{34} + F_{38} + F_{43} - F_{47} + c_4 \cdot F_{48} - F_{52} - F_{61} - F_{63}$ $\tau_{31} = c_4 \cdot F_1 - F_{14} - F_{17} - F_{19} + F_{28} + F_{30} + F_{35} + F_{37} - F_{42} - F_{44} - F_{53} - F_{55} + c_4 \cdot F_{56} + F_{58}$ $\tau_{32} = c_4 \cdot F_5 + F_{12} + F_{14} + F_{19} + F_{23} + F_{26} + F_{33} - F_{39} + c_4 \cdot F_{40} - F_{46} + F_{49} - F_{53} + F_{58} - F_{60}$ $\tau_{33} = c_4 \cdot F_7 + c_4 \cdot F_8 - F_{10} - F_{21} + F_{23} - F_{26} + F_{28} + F_{35} - F_{37} + F_{44} - F_{46} - F_{49} + F_{51} - F_{62}$ $\tau_{34} = -c_4 \cdot F_2 - F_{13} + F_{15} + c_4 \cdot F_{16} + F_{20} + F_{27} + F_{31} - F_{34} - F_{38} - F_{41} - F_{45} + F_{52} + F_{57} + F_{59}$ $\tau_{35} = -c_4 \cdot F_5 - F_{10} + F_{12} + F_{19} + F_{23} + c_4 \cdot F_{24} - F_{30} - F_{33} + F_{39} \; F_{42} + F_{49} - F_{53} + F_{60} + F_{62}$ $\tau_{36} = c_4 \cdot F_4 + F_{11} - F_{13} - F_{18} - F_{22} - F_{25} + F_{31} + c_4 \cdot F_{32} + F_{41} + F_{47} - F_{50} + F_{54} - F_{59} - F_{61}$ $\tau_{37} = c_4 \cdot F_3 + F_{12} - F_{14} - F_{17} - F_{21} - F_{26} + F_{33} + F_{39} + c_4 \cdot F_{40} + F_{46} - F_{51} + F_{55} - F_{58} - F_{60}$ $\tau_{38} = -c_4 \cdot F_6 - F_9 + F_{11} + F_{20} + F_{25} - F_{29} - F_{34} + F_{38} - F_{43} + F_{47} + c_4 \cdot F_{48} - F_{52} + F_{61} + F_{63}$ $\tau_{39} = -c_4 \cdot F_1 - F_{14} + F_{17} + F_{19} + F_{28} + F_{30} - F_{35} - F_{37} - F_{42} - F_{44} + F_{53} + F_{55} + c_4 \cdot F_{56} + F_{58}$ $\tau_{40} = c_4 F_4 + F_{11} + F_{13} + F_{18} + F_{22} + F_{25} + F_{31} + c_4 \cdot F_{32} + F_{41} - F_{47} + F_{50} - F_{54} + F_{59} - F_{61}$ $\tau_{41} = c_4 \cdot F_8 + F_{14} + F_{19} - F_{23} - F_{28} + F_{30} - F_{33} - F_{39} - F_{42} - F_{44} - F_{49} - F_{53} - F_{58}$ $\tau_{42} = c_4 \cdot F_6 + F_{11} - F_{15} + c_4 \cdot F_{16} - F_{20} - F_{25} + F_{27} - F_{34} - F_{38} - F_{45} - F_{47} - F_{52} - F_{57} + F_{61}$ $\tau_{43} = -c_4 \cdot F_7 - F_{12} + F_{14} - F_{17} + F_{19} + c_4 \cdot F_{24} - F_{26} + F_{35} - F_{37} + F_{46} - F_{53} - F_{55} + F_{58} - F_{60}$ $\tau_{44} = -c_4 \cdot F_4 - F_9 - F_{15} - F_{18} + F_{22} + F_{27} - F_{29} + c_4 \cdot F_{32} + F_{43} + F_{45} + F_{50} + F_{54} + F_{57} + F_{63}$ $\tau_{45} = -c_4 \cdot F_1 - F_{10} - F_{12} - F_{21} - F_{23} + F_{30} + F_{35} + F_{37} + c_4 \cdot F_{40} + F_{42} + F_{49} + F_{51} + F_{60} + F_{62}$ $\tau_{46} = -c_4 \cdot F_2 - F_9 - F_{13} - F_{20} + F_{29} - F_{31} + F_{34} + F_{38} + F_{41} + F_{43} + c_4 \cdot F_{48} + F_{52} + F_{59} + F_{63}$ $\tau_{47} = -c_4 \cdot F_5 - F_{10} - F_{17} + F_{21} + F_{26} - F_{28} - F_{33} - F_{39} + F_{44} + F_{46} + F_{51} + F_{55} + c_4 \cdot F_{56} - F_{62}$ $\tau_{48} = c_4 \cdot F_3 + F_{10} + F_{12} + F_{17} + F_{21} + c_4 \cdot F_{24} + F_{30} + F_{33} + F_{39} + F_{42} + F_{51} - F_{55} + F_{60} - F_{62}$ $\tau_{49} = c_4 \cdot F_5 + c_4 \cdot F_8 - F_{14} - F_{17} + F_{21} - F_{28} - F_{30} - F_{33} + F_{39} + F_{42} - F_{44} + F_{51} + F_{55} + F_{58}$ $\tau_{50} = -c_4 \cdot F_6 - F_9 + F_{13} + c_4 \cdot F_{16} - F_{20} + F_{29} + F_{31} + F_{34} - F_{38} - F_{41} + F_{43} - F_{52} + F_{59} + F_{63}$ $\tau_{51} = -c_4 \cdot F_1 - F_{12} - F_{14} + F_{21} + F_{23} + c_4 \cdot F_{24} + F_{26} + F_{35} + F_{37} - F_{46} - F_{49} - F_{51} - F_{58} - F_{60}$ $\tau_{52} = -c_4 \cdot F_4 - F_9 + F_{15} + F_{18} - F_{22} + F_{27} \; F_{29} + c_4 \cdot F_{32} - F_{43} + F_{45} - F_{50} - F_{54} - F_{57} - F_{63}$ $\tau_{53} = c_4 \cdot F_7 + F_{10} - F_{12} - F_{17} + F_{19} - F_{30} - F_{35} + F_{37} + c_4 \cdot F_{40} - F_{42} + F_{53} - F_{55} + F_{60} - F_{62}$ $\tau_{54} = c_4 \cdot F_2 + F_{11} + F_{15} - F_{20} - F_{25} - F_{27} - F_{34} - F_{38} + F_{45} - F_{47} + c_4 \cdot F_{48} + F_{52} + F_{57} + F_{61}$ $\tau_{55} = c_4 \cdot F_3 + F_{10} - F_{19} + F_{23} - F_{26} - F_{28} - F_{33} - F_{39} + F_{44} - F_{46} + F_{49} + F_{53} + c_4 \cdot F_{56} + F_{62}$ $\tau_{56} = c_4 \cdot F_2 + F_9 + F_{11} + c_4 \cdot F_{16} + F_{20} + F_{25} + F_{29} + F_{34} + F_{38} + F_{43} + F_{47} + F_{52} + F_{61} - F_{63}$ $\tau_{57} = -c_4 \cdot F_1 + c_4 \cdot F_8 + F_{10} - F_{17} - F_{19} + F_{26} + F_{28} + -F_{35} - F_{37} + F_{44} + F_{46} - F_{53} - F_{55} + F_{62}$ $\tau_{58} = c_4 \cdot F_2 - F_9 - F_{11} + c_4 \cdot F_{16} + F_{20} - F_{25} - F_{29} + F_{34} + F_{38} - F_{43} - F_{47} + F_{52} - F_{61} + F_{63}$ $\tau_{59}=-c_4 \cdot F_3+F_{10}+F_{12}-F_{17}-F_{21}+c_4 \cdot F_{24}+F_{30}-F_{33}-F_{39}+F_{42}-F_{51}+F_{55}+F_{60}-F_{62}$ $\tau_{60}=c_4 \cdot F_4-F_{11}-F_{13}+F_{18}+F_{22}-F_{25}-F_{31}+c_4 \cdot F_{32}-F_{41}+F_{47}+F_{50}-F_{54}-F_{59}+F_{61}$ $\tau_{61}=c_4 \cdot F_6-F_{13}-F_{15}+F_{20}-F_{27}+F_{31}+F_{34}-F_{38}-F_{41}+F_{45}+c_4 \cdot F_{48}-F_{52}-F_{57}+F_{59}$ $\tau_{62}=-c_4 \cdot F_5+F_{12}+F_{14}-F_{19}-F_{23}+F_{26}-F_{33}+F_{39}+c_4 \cdot F_{40}-F_{46}+F_{49}+F_{53}+F_{58}-F_{60}$ $\tau_{63}=-c_4 \cdot F_7+F_{14}-F_{21}+F_{23}+F_{28}-F_{30}-F_{35}+F_{37}+F_{42}-F_{44}-F_{49}+F_{51}+c_4 \cdot F_{56}-58$ After the inverse transform coefficients are generated, these coefficients are used to generate the IDCT matrix using the following inverse transform equations.

$f_0=c_0 \cdot \tau_0+c_1 \cdot \tau_8+c_2 \cdot \tau_{56}+c_3 \cdot \tau_{48}+c_4 \cdot \tau_{40}+c_5 \cdot \tau_{32}+c_6 \cdot \tau_{24}+c_7 \cdot \tau_{16}$ $f_1=c_0 \cdot \tau_1+c_1 \cdot \tau_9+c_2 \cdot \tau_{10}+c_3 \cdot \tau_{11}+c_4 \cdot \tau_{12}+c_5 \cdot \tau_{13}+c_6 \cdot \tau_{14}+c_7 \cdot \tau_{15}$ $f_2=c_0 \cdot \tau_6+c_1 \cdot \tau_{17}+c_2 \cdot \tau_{18}+c_3 \cdot \tau_{19}+ \quad c_4 \cdot \tau_{20}+c_5 \cdot \tau_{21}+c_6 \cdot \tau_{22}+c_7 \cdot \tau_{23}$ $f_3=c_0 \cdot \tau_7+c_1 \cdot \tau_{25}+c_2 \cdot \tau_{26}+c_3 \cdot \tau_{27}+ \quad c_4 \cdot \tau_{28}+c_5 \cdot \tau_{29}+c_6 \cdot \tau_{30}+c_7 \cdot \tau_{31}$   $f_4=c_0 \cdot \tau_5+c_1 \cdot \tau_{33}+c_2 \cdot \tau_{34}+c_3 \cdot \tau_{35}+c_4 \cdot \tau_{36}+c_5 \cdot \tau_{37}+c_6 \cdot \tau_{38}+c_7 \cdot \tau_{39}$ $f_5=c_0 \cdot \tau_4+c_1 \cdot \tau_{41}+c_2 \cdot \tau_{42}+c_3 \cdot \tau_{43}+ \quad c_4 \cdot \tau_{44}+c_5 \cdot \tau_{45}+c_6 \cdot \tau_{46}+c_7 \cdot \tau_{47}$ $f_6=c_0 \cdot \tau_3+c_1 \cdot \tau_{49}+c_2 \cdot \tau_{50}+c_3 \cdot \tau_{51}+ \quad c_4 \cdot \tau_{52}+c_5 \cdot \tau_{53}+c_6 \cdot \tau_{54}+c_7 \cdot \tau_{55}$ $f_7=c_0 \cdot \tau_2+c_1 \cdot \tau_{57}+c_2 \cdot \tau_{58}+c_3 \cdot \tau_{59}+ \quad c_4 \cdot \tau_{60}+c_5 \cdot \tau_{62}+c_6 \cdot \tau_{61}+c_7 \cdot \tau_{63}$ $f_8=c_0 \cdot \tau_4-c_1 \cdot \tau_{45}-c_2 \cdot \tau_{46}+c_3 \cdot \tau_{41}- \quad c_4 \cdot \tau_{44}-c_5 \cdot \tau_{47}+c_6 \cdot \tau_{42}-c_7 \cdot \tau_{43}$ $f_9=c_0 \cdot \tau_0-c_1 \cdot \tau_{32}-c_2 \cdot \tau_{24}+c_3 \cdot \tau_8-c_4 \cdot \tau_{40}-c_5 \cdot \tau_{16}+c_6 \cdot \tau_{56}-c_7 \cdot \tau_{48}$ $f_{10}=c_0 \cdot \tau_5-c_1 \cdot \tau_{37}-c_2 \cdot \tau_{38}+c_3 \cdot \tau_{33}- \quad c_4 \cdot \tau_{36}-c_5 \cdot \tau_{39}+c_6 \cdot \tau_{34}-c_7 \cdot \tau_{35}$ $f_{11}=c_0 \cdot \tau_3-c_1 \cdot \tau_{53}-c_2 \cdot \tau_{54}+c_3 \cdot \tau_{49}- \quad c_4 \cdot \tau_{52}-c_5 \cdot \tau_{55}+c_6 \cdot \tau_{50}-c_7 \cdot \tau_{51}$ $f_{12}=c_0 \cdot \tau_1-c_1 \cdot \tau_{13}-c_2 \cdot \tau_{14}+c_3 \cdot \tau_9- \quad c_4 \cdot \tau_{12}-c_5 \cdot \tau_{15}+c_6 \cdot \tau_{10}-c_7 \cdot \tau_{11}$ $f_{13}=c_0 \cdot \tau_7-c_1 \cdot \tau_{29}-c_2 \cdot \tau_{30}+c_3 \cdot \tau_{25}- \quad c_4 \cdot \tau_{28}-c_5 \cdot \tau_{31}+c_6 \cdot \tau_{26}-c_7 \cdot \tau_{27}$ $f_{14}=c_0 \cdot \tau_2-c_1 \cdot \tau_{62}-c_2 \cdot \tau_{61}+c_3 \cdot \tau_{57}- \quad c_4 \cdot \tau_{60}-c_5 \cdot \tau_{63}+c_6 \cdot \tau_{58}-c_7 \cdot \tau_{59}$ $f_{15}=c_0 \cdot \tau_6-c_1 \cdot \tau_{21}-c_2 \cdot \tau_{22}+c_3 \cdot \tau_{17}- \quad c_4 \cdot \tau_{20}-c_5 \cdot \tau_{23}+c_6 \cdot \tau_{18}-c_7 \cdot \tau_{19}$ $f_{16}=c_0 \cdot \tau_3-c_1 \cdot \tau_{51}+c_2 \cdot \tau_{54}+c_3 \cdot \tau_{55}- \quad c_4 \cdot \tau_{52}+c_5 \cdot \tau_{49}-c_6 \cdot \tau_{50}+c_7 \cdot \tau_{53}$ $f_{17}=c_0 \cdot \tau_7-c_1 \cdot \tau_{27}+c_2 \cdot \tau_{30}+c_3 \cdot \tau_{31}- \quad c_4 \cdot \tau_{28}+c_5 \cdot \tau_{25}-c_6 \cdot \tau_{26}+c_7 \cdot \tau_{29}$ $f_{18}=c_0 \cdot \tau_0-c_1 \cdot \tau_{48}+c_2 \cdot \tau_{24}+c_3 \cdot \tau_{16}- \quad c_4 \cdot \tau_{40}+c_5 \cdot \tau_8-c_6 \cdot \tau_{56}+c_7 \cdot \tau_{32}$ $f_{19}=c_0 \cdot \tau_6-c_1 \cdot \tau_{19}+c_2 \cdot \tau_{22}+c_3 \cdot \tau_{23}- \quad c_4 \cdot \tau_{20}+c_5 \cdot \tau_{17}-c_6 \cdot \tau_{18}+c_7 \cdot \tau_{21}$ $f_{20}=c_0 \cdot \tau_4-c_1 \cdot \tau_{43}+c_2 \cdot \tau_{46}+c_3 \cdot \tau_{47}- \quad c_4 \cdot \tau_{44}+c_5 \cdot \tau_{41}-c_6 \cdot \tau_{42}+c_7 \cdot \tau_{45}$ $f_{21}=c_0 \cdot \tau_2-c_1 \cdot \tau_{59}+c_2 \cdot \tau_{61}+c_3 \cdot \tau_{63}- \quad c_4 \cdot \tau_{60}+c_5 \cdot \tau_{57}-c_6 \cdot \tau_{58}+c_7 \cdot \tau_{62}$ $f_{22}=c_0 \cdot \tau_5-c_1 \cdot \tau_{35}+c_2 \cdot \tau_{38}+c_3 \cdot \tau_{39}- \quad c_4 \cdot \tau_{36}+c_5 \cdot \tau_{33}-c_6 \cdot \tau_{34}+c_7 \cdot \tau_{37}$ $f_{23}=c_0 \cdot \tau_1-c_1 \cdot \tau_{11}+c_2 \cdot \tau_{14}+c_3 \cdot \tau_{15}- \quad c_4 \cdot \tau_{12}+c_5 \cdot \tau_9-c_6 \cdot \tau_{10}+c_7 \cdot \tau_{13}$ $f_{24}=c_0 \cdot \tau_5-c_1 \cdot \tau_{39}-c_2 \cdot \tau_{34}+c_3 \cdot \tau_{37}+ \quad c_4 \cdot \tau_{36}-c_5 \cdot \tau_{35}-c_6 \cdot \tau_{38}+c_7 \cdot \tau_{33}$ $f_{25}=c_0 \cdot \tau_6-c_1 \cdot \tau_{23}-c_2 \cdot \tau_{18}+c_3 \cdot \tau_{21}+ \quad c_4 \cdot \tau_{20}-c_5 \cdot \tau_{19}-c_6 \cdot \tau_{54}+c_7 \cdot \tau_{17}$ $f_{26}=c_0 \cdot \tau_3-c_1 \cdot \tau_{55}-c_2 \cdot \tau_{50}+c_3 \cdot \tau_{53}+c_4 \cdot \tau_{52}-c_5 \cdot \tau_{51}-c_6 \cdot \tau_{54}+c_7 \cdot \tau_{49}$ $f_{27}=c_0 \cdot \tau_0-c_1 \cdot \tau_{16}-c_2 \cdot \tau_{56}+c_3 \cdot \tau_{32}+ \quad c_4 \cdot \tau_{40}-c_5 \cdot \tau_{48}-c_6 \cdot \tau_{24}+c_7 \cdot \tau_8$ $f_{28}=c_0 \cdot \tau_2-c_1 \cdot \tau_{63}-c_2 \cdot \tau_{58}+c_3 \cdot \tau_{62}+ \quad c_4 \cdot \tau_{60}-c_5 \cdot \tau_{59}-c_6 \cdot \tau_{61}+c_7 \cdot \tau_{57}$ $f_{29}=c_0 \cdot \tau_1-c_1 \cdot \tau_{15}-c_2 \cdot \tau_{10}+c_3 \cdot \tau_{13}+c_4 \cdot \tau_{12}-c_5 \cdot \tau_{11}-c_6 \cdot \tau_{14}+c_7 \cdot \tau_9$ $f_{30}=c_0 \cdot \tau_4-c_1 \cdot \tau_{47}-c_2 \cdot \tau_{42}+c_3 \cdot \tau_{45}+c_4 \cdot \tau_{44}-c_5 \cdot \tau_{43}-c_6 \cdot \tau_{46}+c_7 \cdot \tau_{41}$ $f_{31}=c_0 \cdot \tau_7-c_1 \cdot \tau_{31}-c_2 \cdot \tau_{26}+c_3 \cdot \tau_{29}+c_4 \cdot \tau_{28}-c_5 \cdot \tau_{27}-c_6 \cdot \tau_{30}+c_7 \cdot \tau_{25}$ $f_{32}=c_0 \cdot \tau_7+c_1 \cdot \tau_{31}-c_2 \cdot \tau_{26}-c_3 \cdot \tau_{29}+ \quad c_4 \cdot \tau_{28}+c_5 \cdot \tau_{27}-c_6 \cdot \tau_{30}-c_7 \cdot \tau_{25}$ $f_{33}=c_0 \cdot \tau_4+c_1 \cdot \tau_{47}-c_2 \cdot \tau_{42}-c_3 \cdot \tau_{45}+c_4 \cdot \tau_{44}+c_5 \cdot \tau_{43}-c_6 \cdot \tau_{46}-c_7 \cdot \tau_{41}$ $f_{34}=c_0 \cdot \tau_1+c_1 \cdot \tau_{15}-c_2 \cdot \tau_{10}-c_3 \cdot \tau_{13}+ \quad c_4 \cdot \tau_{12}+c_5 \cdot \tau_{11}-c_6 \cdot \tau_{14}-c_7 \cdot \tau_9$ $f_{35}=c_0 \cdot \tau_2+c_1 \cdot \tau_{63}-c_2 \cdot \tau_{58}-c_3 \cdot \tau_{62}+ \quad c_4 \cdot \tau_{60}+c_5 \cdot \tau_{59}-c_6 \cdot \tau_{61}-c_7 \cdot \tau_{57}$ $f_{36}=c_0 \cdot \tau_0+c_1 \cdot \tau_{16}-c_2 \cdot \tau_{56}-c_3 \cdot \tau_{32}+ \quad c_4 \cdot \tau_{40}+c_5 \cdot \tau_{48}-c_6 \cdot \tau_{24}-c_7 \cdot \tau_8$ $f_{37}=c_0 \cdot \tau_3+c_1 \cdot \tau_{55}-c_2 \cdot \tau_{50}-c_3 \cdot \tau_{53}+c_4 \cdot \tau_{52}+c_5 \cdot \tau_{51}-c_6 \cdot \tau_{54}-c_7 \cdot \tau_{49}$ $f_{38}=c_0 \cdot \tau_6+c_1 \cdot \tau_{23}-c_2 \cdot \tau_{18}-c_3 \cdot \tau_{21}+ \quad c_4 \cdot \tau_{20}+c_5 \cdot \tau_{19}-c_6 \cdot \tau_{22}-c_7 \cdot \tau_{17}$ $f_{39}=c_0 \cdot \tau_5+c_1 \cdot \tau_{39}-c_2 \cdot \tau_{43}-c_3 \cdot \tau_{37}+ \quad c_4 \cdot \tau_{36}+c_5 \cdot \tau_{35}-c_6 \cdot \tau_{38}-c_7 \cdot \tau_{33}$ $f_{40}=c_0 \cdot \tau_1+c_1 \cdot \tau_{11}+c_2 \cdot \tau_{14}-c_3 \cdot \tau_{15}- \quad c_4 \cdot \tau_{12}+c_5 \cdot \tau_9-c_6 \cdot \tau_{10}-c_7 \cdot \tau_{13}$ $f_{41}=c_0 \cdot \tau_5+c_1 \cdot \tau_{35}+c_2 \cdot \tau_{38}-c_3 \cdot \tau_{39}- \quad c_4 \cdot \tau_{36}-c_5 \cdot \tau_{33}-c_6 \cdot \tau_{34}-c_7 \cdot \tau_{37}$ $f_{42}=c_0 \cdot \tau_2+c_1 \cdot \tau_{59}+c_2 \cdot \tau_{61}-c_3 \cdot \tau_{63}- \quad c_4 \cdot \tau_{60}-c_5 \cdot \tau_{57}-c_6 \cdot \tau_{58}-c_7 \cdot \tau_{62}$ $f_{43}=c_0 \cdot \tau_4+c_1 \cdot \tau_{43}+c_2 \cdot \tau_{46}-c_3 \cdot \tau_{47}- \quad c_4 \cdot \tau_{44}-c_5 \cdot \tau_{41}-c_6 \cdot \tau_{42}-c_7 \cdot \tau_{45}$ $f_{44}=c_0 \cdot \tau_6+c_1 \cdot \tau_{19}+c_2 \cdot \tau_{22}-c_3 \cdot \tau_{23}- \quad c_4 \cdot \tau_{20}-c_5 \cdot \tau_{17}-c_6 \cdot \tau_{18}+c_7 \cdot \tau_{21}$ $f_{45}=c_0 \cdot \tau_0+c_1 \cdot \tau_{48}+c_2 \cdot \tau_{24}-c_3 \cdot \tau_{16}- \quad c_4 \cdot \tau_{40}-c_5 \cdot \tau_8-c_6 \cdot \tau_{56}-c_7 \cdot \tau_{32}$ $f_{46}=c_0 \cdot \tau_7+c_1 \cdot \tau_{27}+c_2 \cdot \tau_{30}-c_3 \cdot \tau_{31}- \quad c_4 \cdot \tau_{28}-c_5 \cdot \tau_{25}-c_6 \cdot \tau_{26}-c_7 \cdot \tau_{29}$ $f_{47}=c_0 \cdot \tau_3+c_1 \cdot \tau_{51}+c_2 \cdot \tau_{54}-c_3 \cdot \tau_{55}- \quad c_4 \cdot \tau_{52}-c_5 \cdot \tau_{49}-c_6 \cdot \tau_{50}-c_7 \cdot \tau_{53}$ $f_{48}=c_0 \cdot \tau_6+c_1 \cdot \tau_{21}-c_2 \cdot \tau_{22}-c_3 \cdot \tau_{17}- \quad c_4 \cdot \tau_{20}+c_5 \cdot \tau_{23}+c_6 \cdot \tau_{18}+c_7 \cdot \tau_{19}$ $f_{49}=c_0 \cdot \tau_2+c_1 \cdot \tau_{62}-c_2 \cdot \tau_{61}-c_3 \cdot \tau_{57}- \quad c_4 \cdot \tau_{60}+c_5 \cdot \tau_{63}+c_6 \cdot \tau_{58}+c_7 \cdot \tau_{59}$ $f_{50}=c_0 \cdot \tau_7+c_1 \cdot \tau_{29}-c_2 \cdot \tau_{30}-c_3 \cdot \tau_{25}- \quad c_4 \cdot \tau_{28}+c_5 \cdot \tau_{31}+c_6 \cdot \tau_{26}+c_7 \cdot \tau_{27}$ $f_{51}=c_0 \cdot \tau_1+c_1 \cdot \tau_{13}-c_2 \cdot \tau_{14}-c_3 \cdot \tau_9- \quad c_4 \cdot \tau_{12}+c_5 \cdot \tau_{15}+c_6 \cdot \tau_{10}+c_7 \cdot \tau_{11}$ $f_{52}=c_0 \cdot \tau_3+c_1 \cdot \tau_{53}-c_2 \cdot \tau_{54}-c_3 \cdot \tau_{49}- \quad c_4 \cdot \tau_{52}+c_5 \cdot \tau_{55}+c_6 \cdot \tau_{50}+c_7 \cdot \tau_{51}$ $f_{53}=c_0 \cdot \tau_5+c_1 \cdot \tau_{37}-c_2 \cdot \tau_{38}-c_3 \cdot \tau_{33}- \quad c_4 \cdot \tau_{36}+c_5 \cdot \tau_{39}+c_6 \cdot \tau_{34}+c_7 \cdot \tau_{35}$ $f_{54}=c_0 \cdot \tau_0+c_1 \cdot \tau_{32}-c_2 \cdot \tau_{24}-c_3 \cdot \tau_8- \quad c_4 \cdot \tau_{40}+c_5 \cdot \tau_{16}+c_6 \cdot \tau_{56}+c_7 \cdot \tau_{48}$ $f_{55}=c_0 \cdot \tau_4+c_1 \cdot \tau_{45}-c_2 \cdot \tau_{46}-c_3 \cdot \tau_{41}- \quad c_4 \cdot \tau_{44}+c_5 \cdot \tau_{47}+c_6 \cdot \tau_{42}+c_7 \cdot \tau_{43}$ $f_{56}=c_0 \cdot \tau_2-c_1 \cdot \tau_{57}+c_2 \cdot \tau_{58}-c_3 \cdot \tau_{59}+ \quad c_4 \cdot \tau_{60}-c_5 \cdot \tau_{62}+c_6 \cdot \tau_{61}-c_7 \cdot \tau_{63}$ $f_{57}=c_0 \cdot \tau_3-c_1 \cdot \tau_{49}+c_2 \cdot \tau_{50}-c_3 \cdot \tau_{51}+ \quad c_4 \cdot \tau_{52}-c_5 \cdot \tau_{53}+c_6 \cdot \tau_{54}-c_7 \cdot \tau_{55}$ $f_{58}=c_0 \cdot \tau_4-c_1 \cdot \tau_{41}+c_2 \cdot \tau_{42}-c_3 \cdot \tau_{43}+ \quad c_4 \cdot \tau_{44}-c_5 \cdot \tau_{45}+c_6 \cdot \tau_{46}-c_7 \cdot \tau_{47}$ $f_{59}=c_0\cdot\tau_5-c_1\cdot\tau_{33}+c_2\cdot\tau_{34}-c_3\cdot\tau_{35}+c_4\cdot\tau_{36}-c_5\cdot\tau_{37}+c_6\cdot\tau_{38}-c_7\cdot\tau_{39}$ $f_{60}=c_0\cdot\tau_7-c_1\cdot\tau_{25}+c_2\cdot\tau_{26}-c_3\cdot\tau_{27}+c_4\cdot\tau_{28}-c_5\cdot\tau_{29}+c_6\cdot\tau_{30}-c_7\cdot\tau_{31}$ $f_{61}=c_0\cdot\tau_6-c_1\cdot\tau_{17}+c_2\cdot\tau_{18}-c_3\cdot\tau_{19}+c_4\cdot\tau_{20}-c_5\cdot\tau_{21}+c_6\cdot\tau_{22}-c_7\cdot\tau_{23}$ $f_{62}=c_0\cdot\tau_1-c_1\cdot\tau_9+c_2\cdot\tau_{10}-c_3\cdot\tau_{11}+c_4\cdot\tau_{12}-c_5\cdot\tau_{13}+c_6\cdot\tau_{14}-c_7\cdot\tau_{15}$ $f_{63}=c_0\cdot\tau_0-c_1\cdot\tau_8+c_2\cdot\tau_{56}-c_3\cdot\tau_{48}+c_4\cdot\tau_{40}-c_5\cdot\tau_{32}+c_6\cdot\tau_{24}-c_7\cdot\tau_{16}$ Accordingly, using this process, a frequency matrix of data elements is provided to input accumulators 52, which calculate the inverse transform coefficients. DSP 62 retrieves the inverse transform coefficients and multiplies the inverse transform coefficients by the constants $c_0$ to $c_7$ and $r_0$ to $r_7$ to generate transform products. The multiplications are performed sequentially using the transform coefficients and constants as they are stored in the first and second data memory. Output accumulators 54 retrieve the transform coefficients and calculate the spacial matrix of data elements.

More specifically, referring to FIGS. 1 and 2, as with the forward transform, when performing an inverse transform input accumulator circuits 52 and output accumulator circuits 54 are memory mapped to occupy 706 locations of address space in DSP 62. Input accumulator circuits 52 are accessed using 64 input accumulator write addresses ($II_0$ to $II_{63}$), input accumulator circuits 52 are accessed using input accumulator read addresses ($IC_0$ to $IC_{63}$), output accumulator circuits 54 are accessed using 512 (8*64) output accumulator write addresses ($OI_0^0$ to $OI_{63}^7$) and output accumulator circuits 54 are accessed using output accumulator write addresses ($OC_0$ to $OC_{63}$). Two additional addresses, an input clear address (ICA) and an output clear address (OCA) are used to generate clear signals to the input accumulator circuits and the output accumulator circuits, respectively. The input accumulator read addresses, IC, which store the transform coefficients, and the output accumulator write addresses, OI, are distributed within the DSP memory space such that these addresses may be sequentially accessed when DSP 62 is performing the multiplication portion of the DCT.

When operating DCT engine 50, a plurality of transform coefficients are generated by accumulating the input matrix of data, a plurality of transform products are generated by multiplying the transform coefficients by transform constants and the plurality of transform products are accumulated to produce the transformed matrix. The transform coefficients are available at the input accumulator write addresses substantially simultaneously but are stored within the memory of DSP 62 in a distributed order such that they may be sequentially accessed by DSP 62. Additionally, the inverse transform products are generated by DSP 62 such that the inverse transform products may be stored in the DSP memory using sequential addressing.

When initiating an inverse DCT, the processor clears all input accumulator circuits by writing to the ICA address and clears all output accumulator circuits by writing to the OCA address. Next, DCT engine 50 retrieves the frequency matrix to the appropriate addresses $II_0$ to $II_{63}$. While this is occurring, IAdd(0)–IAdd(63) form the transform coefficients $\tau_0$–$\tau_{63}$. The processor then reads the transform coefficient $\tau_{10}$ from IAdd(0) via the address $IC_{10}$. Using this transform coefficient in combination with the other transform coefficients as well as the transform constants, the processor which is coupled to I/O bus 60 generates the transform product values. These product values are written to the appropriate addresses to be read by the appropriate output accumulator circuits. For example, $c_7\cdot\tau_{63}$ is written to address $OI_{63}^7$. Accordingly, address selection unit 72 for the output accumulation circuits which require this transform product value access this address to add or subtract this value. The transformed output for location 0, which is produced by OAdd(0) is then provided to output address $OC_0$.

Figure 8A:
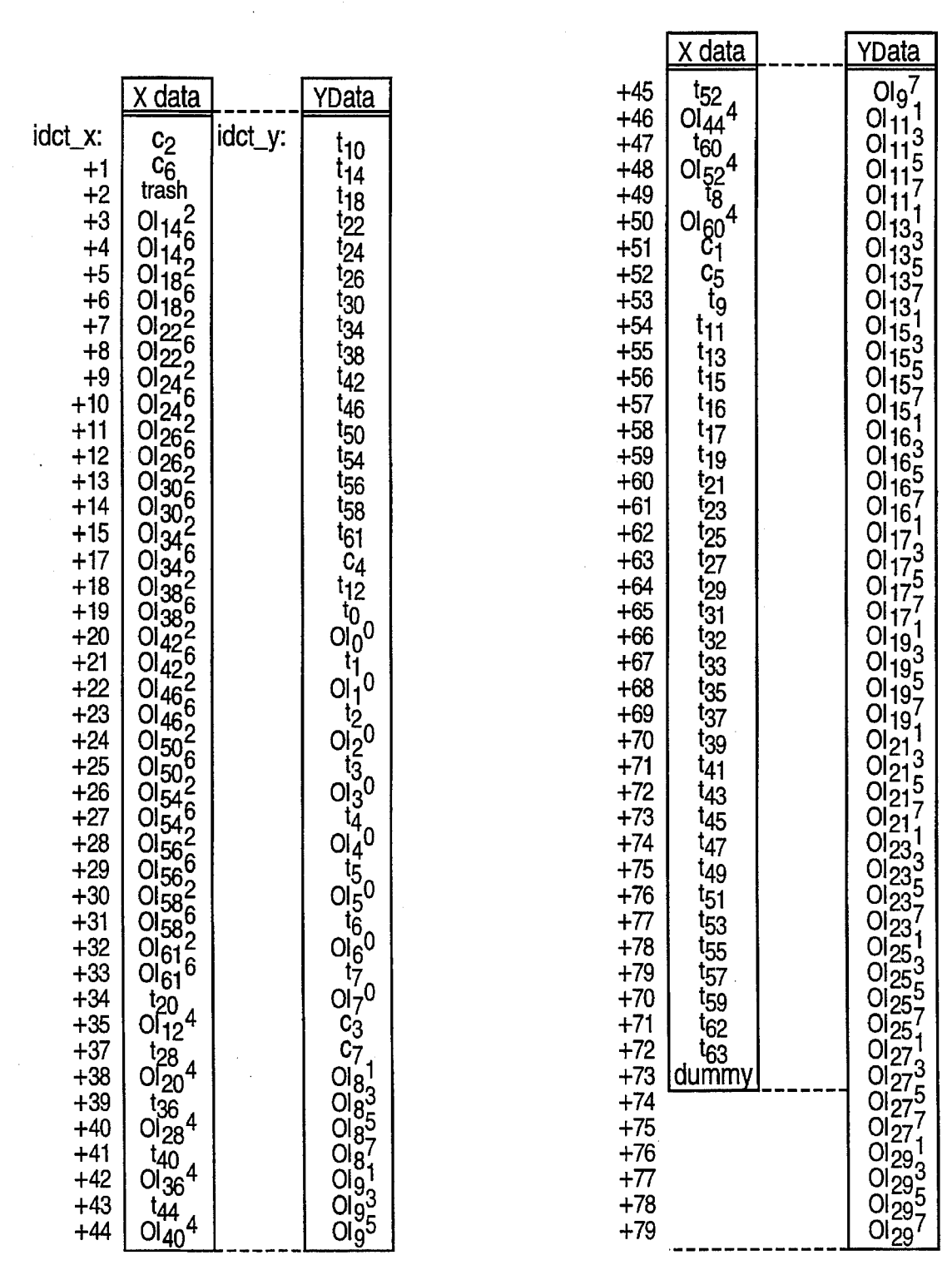

The sequential addressing aspect of the multiplication is determined by using the multiplication distribution of constants and transform coefficients set forth in FIG. 7. This distribution is based upon the distribution of constants and transform coefficients in the inverse transform equations. By using this distribution of constants and transform coefficients, the constants, transform coefficients, and transform products are stored according to the memory distribution set forth in FIGS. 8A and 8B, thus allowing DSP 62 to perform the operations using sequential addressing. Because any processing that provides the matrix of data provides the data in the order that is set forth by the arrow in FIG. 3, the arrangement in memory of the input matrix of data, F, corresponds to the order set forth by the FIG. 3 arrow.

Figure 9:
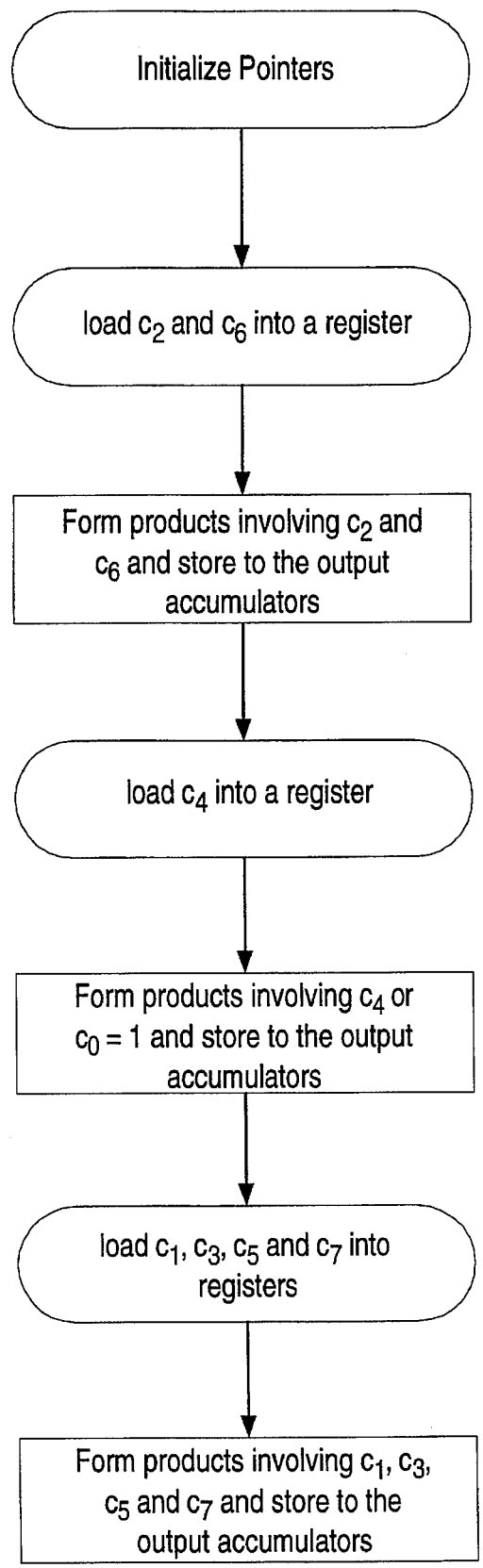
FIG. 9 shows a flow chart of the process of performing the multiplication portion of an inverse DCT using a DSP.

More specifically, the inverse transform products are generated by manipulating the inverse transform coefficients and transform constants in accordance with the FIG. 9 flow chart. The implementation of this process for DSP 62 is set forth in Table 2. The operation of the instructions within Table 2 are consistent with similar instructions which are present in Table 1.

TABLE 2

```
dp0 = idct_x;
dp4 = idct_y;
r2 = *dp0 ++;                                                                            //r2 = c_2
r6 = *dp0 ++                                           r4 = *dp4 ++;                     //r6 = c_6 r4 =tau10
loop 16 {
    r7 = r4h *r2h           *dp0 ++ = r7h;             //first store is of garbage
    r7 = r4h *r6h           *dp0 ++ = r7h              r4 = *dp4 ++;
    ;                       //r4h = tau-14,18,22,24,26,30,34,38,42,46,50,54,56,58,61,c_4
};
                                                       r6 = *dp4 ++;                     //r6 = tau12
loop 8 {;
                            *dp0 ++ = r7h              r2 = *dp4 ++;                     //r2 = tau-0,1,2,3,4,5,6,7
    r7 = r6h * r4h          r6 = *dp0 ++              *dp4 ++ = r2h; //r6 = tau-20,28,36,40,44,52,60,8
};
                            r0 = *dp0 ++              r1 = *dp4 ++;                     //r0 = c_1; r1 = 3
r2 = *dp0 ++ r3 = *dp4 ++;                                                               //r2 = c_5; r3 = c_7
loop 32 {;
    r7 = r0h *r6h                                      *dp4 ++= r7h;
```

TABLE 2-continued

```
r7 = r1h *r6h                          *dp4 ++= r7h;
r7 = r2h *r6h                          *dp4 ++= r7h;
r7 = r3h *r6h r6 = *dp0 ++             *dp4 ++= r7h;
};              //                     r6h = tau-9,11,13,15,16,17,19,21,23,25,27,29,31,32,33,35,
;               //                             37,39,41,43,45,47,49,51,53,55,57,59,62,63,dummy
```

Output accumulators 54 retrieve the transform products as these products are stored within the DSP memory. Output accumulators 54 then accumulate the transform products and provide a spacial matrix of data elements to the output accumulator write addresses; the spacial matrix of data elements is the inverse DCT of the input frequency data matrix.

DCT engine 50 uses accumulators 52 and output accumulators 26 to perform the many calculations of an IDCT in parallel. These calculations are divided into discrete calculations which are performed during different cycles. DSP 62, which performs the multiplication portion of the transform, may perform two memory operations with each clock cycle. It takes a total of 189 cycles to perform the multiplication portion of the inverse transform. Individual input accumulators 52 and output accumulators 54 maintain running totals as each new entry is accumulated during a cycle. After the value which an accumulator is calculating is complete, that value is provided to the corresponding input accumulator read address or output accumulator write address.

Inverse DCT engine 50 requires that the inputs $F_1$, $F_2$, $F_3$, $F_4$, $F_5$, $F_6$, $F_7$, $F_8$, $F_{16}$, $F_{24}$, $F_{32}$, $F_{40}$, $F_{48}$, and $F_{56}$ to accumulators 52 be multiplied by $c_4$ and that the input $F_0$ be divided by 2. DSP 62 performs these multiplications as it moves the input data to the input accumulators.

OTHER EMBODIMENTS

Other embodiments are within the following claims.

For example, different types of DSP systems may be used. While the different systems might affect the actual implementation and operation for performing a DCT or IDCT, such systems are still within the scope of the following claims.

Also for example, other types of transforms which use redundant operations may also be performed using engine 50 in combination with DSP 62.

What is claimed is:

1. An apparatus for performing a transform on an array of data elements to provide a transformed array of data elements, the apparatus comprising a plurality of input accumulators, the plurality of accumulators accumulating the input array of data elements in parallel to provide a plurality of transform coefficient outputs;

a digital signal processor having a memory, the digital signal processor for receiving the plurality of transform coefficient outputs and performing multiplication operations using the transform coefficient outputs and transform constants to provide a plurality of transform products, the digital signal processor distributing the plurality of transform coefficients and the transform products in the memory to allow the digital signal processor to efficiently access the plurality of transform coefficients and provide the plurality of transform products; and means for output accumulation, the means for output accumulation receiving the transform products and adding the transform products to provide the transformed array of data elements.

2. The apparatus of claim 1 wherein the input accumulators are coupled to the digital signal processor via an input/output bus.

3. The apparatus of claim 2 wherein each array of data elements is a matrix of data elements, each matrix having a plurality of row locations and a plurality of column locations, the plurality of input accumulators correspond to the row and column locations of the input array, and each input accumulator provides an individual transform coefficient.

4. The apparatus of claim 3 wherein the means for output accumulation includes a plurality of output accumulators corresponding to the row and column locations of the transformed array, and each output accumulator provides the output data element for an individual location of the transformed array.

5. The apparatus of claim 1 wherein the transform uses a plurality of distinct constants, and the digital signal processor is coupled to an input/output bus, the digital signal processor performing the multiplication operations by multiplying the plurality of transform coefficients by the discrete plurality of constants to provide the plurality of transform products.

6. The apparatus of claim 5 wherein the discrete plurality of constants are multiplied by the plurality of transform coefficients sequentially as the transform coefficients and transform constants are stored in the memory of the digital signal processor.

7. The apparatus of claim 6 wherein the transform coefficients and transform constants are stored in the memory of the digital signal processor such that locations in which the transform coefficients and transform constants are stored are memory mapped to respective input accumulators.

8. The apparatus of claim 6 wherein a first set of transform constants and transform coefficients are stored in the memory of the digital signal processor, and multiplication operations are sequentially performed on the first set of transform constants and transform coefficients.

9. The apparatus of claim 8 wherein the set of transform constants are multiplied by each transform coefficient in the first set of transform coefficients to provide a first set of transform products.

10. The apparatus of claim 9 wherein the transform products of the first set of transform products are sequentially stored in the memory of the digital signal processor as the transform products are generated by multiplication operations.

11. The apparatus of claim 8 wherein a second set of transform constants and transform coefficients are stored in the memory of the digital signal processor sequentially after the first set of transform constants and transform coefficients, multiplication operations are sequentially performed on the second set of transform constants and transform coefficients.

12. The apparatus of claim 11 wherein the second set of transform constants are multiplied by each transform coefficient in the second set of transform coefficients to provide a second set of transform products.

13. The apparatus of claim 12 wherein the transform products of the second set of transform products are sequentially stored in the memory of the digital signal processor as the transform products are generated by multiplication operations.

14. The apparatus of claim 11 wherein a third set of transform constants and transform coefficients are stored in the memory of the digital signal processor sequentially after the second set of transform constants and transform coefficients, and multiplication operations are performed on the third set of transform constants and transform coefficients.

15. The apparatus of claim 14 wherein the third set of transform constants are multiplied by each transform coefficient in the third set of transform coefficients to provide a third set of transform products.

16. The apparatus of claim 15 wherein the transform products of the third set of transform products are sequentially stored in the memory of the digital signal processor as the transform products are generated by multiplication operations.

17. The apparatus of 6 wherein the transform products are stored in the memory of the digital signal processor sequentially as the transform products are generated by the digital signal processor.

18. The apparatus of claim 1 wherein the means for output accumulation includes the digital signal processor, the digital signal processor accumulating the plurality of transform products to provide the array of output data.

19. The apparatus of claim 1 wherein the means for output accumulation includes a plurality of output accumulators, the plurality of output accumulators accumulating the plurality of transform products to provide the array of output data elements.

20. The apparatus of 19 wherein the transform products are stored in the memory of the digital signal processor sequentially as the transform products are generated by the digital signal processor.

21. The apparatus of claim 20 wherein the transform products are stored in the memory of the digital signal processor such that locations in which the transform products are stored are memory mapped to respective output accumulators.

22. A method for performing a transform on an array of data, the method comprising providing a plurality of input accumulators, accumulating the input array of data in parallel using the plurality of input accumulators to provide a plurality of transform coefficient outputs;

storing the plurality of transform coefficient outputs in a predetermined order;

accessing the plurality of transform coefficient outputs via the predetermined order, the predetermined order corresponding to when the plurality of transform coefficient outputs are to be multiplied;

multiplying the transform coefficient outputs by constants to provide a plurality of transform products;

providing the plurality of transform products to a respective plurality of transform product address locations; and accumulating the transform products to provide a transformed array of data.

* * * * *